(12) United States Patent
Dietle

(10) Patent No.: US 9,316,319 B2
(45) Date of Patent: Apr. 19, 2016

(54) PRESSURE-BALANCED FLOATING SEAL HOUSING ASSEMBLY AND METHOD

(75) Inventor: Lannie Laroy Dietle, Houston, TX (US)

(73) Assignee: Kalsi Engineering, Inc., Sugar Land, TX (US)

( * ) Notice: Subject to any disclaimer, the term of this patent is extended or adjusted under 35 U.S.C. 154(b) by 0 days.

(21) Appl. No.: 12/957,160

(22) Filed: Nov. 30, 2010

(65) Prior Publication Data

US 2011/0127725 A1 Jun. 2, 2011

Related U.S. Application Data

(60) Provisional application No. 61/283,227, filed on Nov. 30, 2009, provisional application No. 61/284,179, filed on Dec. 14, 2009.

(51) Int. Cl.
*F16J 9/00* (2006.01)
*F16J 15/44* (2006.01)

(52) U.S. Cl.
CPC ...................... *F16J 15/441* (2013.01)

(58) Field of Classification Search
USPC .......................... 277/300, 579, 336, 422, 401
See application file for complete search history.

(56) References Cited

U.S. PATENT DOCUMENTS

| | | | | |
|---|---|---|---|---|
| 3,544,118 A | * | 12/1970 | Klein | 277/579 |
| 3,575,424 A | * | 4/1971 | Taschenberg | 277/411 |
| 3,887,198 A | * | 6/1975 | McClure et al. | 277/579 |
| 4,484,753 A | | 11/1984 | Kalsi | |
| 4,610,319 A | | 9/1986 | Kalsi | |
| 4,848,774 A | * | 7/1989 | Nyilas et al. | 277/388 |
| 5,046,906 A | * | 9/1991 | Bucknell | 411/432 |
| 5,172,921 A | * | 12/1992 | Stenlund | 277/300 |
| 5,178,215 A | | 1/1993 | Yenulis | |
| 5,195,754 A | * | 3/1993 | Dietle | 277/336 |
| 5,199,514 A | | 4/1993 | Titus | |
| 5,224,557 A | | 7/1993 | Yenulis et al. | |
| 5,230,520 A | | 7/1993 | Dietle et al. | |
| 5,279,365 A | | 1/1994 | Yenulis et al. | |
| 5,527,045 A | | 6/1996 | Pondelick | |
| 5,588,491 A | | 12/1996 | Brugman et al. | |
| 5,647,444 A | | 7/1997 | Williams | |
| 5,662,171 A | | 9/1997 | Brugman et al. | |
| 5,662,181 A | | 9/1997 | Williams | |

(Continued)

OTHER PUBLICATIONS

PCT Written Opinion and Search Report of corresponding counterpart international application No. PCT/US2010/58437 dated Feb. 8, 2011.

*Primary Examiner* — Kristina Fulton
*Assistant Examiner* — Eugene G Byrd
(74) *Attorney, Agent, or Firm* — Douglas W. Rommelmann; Andrews Kurth LLP

(57) ABSTRACT

A dynamic sealing mechanism for a machine assembly that includes a seal housing of generally cylindrical form having opposed ends, the seal housing axially positioned between a pressure housing and a retaining member and laterally translatable relative to the pressure housing. The dynamic sealing mechanism includes a shaft located at least partially within the seal housing, the shaft having a sealing surface of generally cylindrical form, relatively movable with respect to the seal housing, and having at least one radial bearing positioned radially by the shaft and locating the radial position of the seal housing. At least three fluid pressure-generated forces act axially on the seal housing to produce a net fluid pressure-generated axial force that is negligible.

195 Claims, 11 Drawing Sheets

(56) References Cited

U.S. PATENT DOCUMENTS

| | | | |
|---|---|---|---|
| 5,662,335 A * | 9/1997 | Larsen | 277/636 |
| 5,678,829 A | 10/1997 | Kalsi et al. | |
| 5,738,358 A | 4/1998 | Kalsi et al. | |
| 5,823,541 A | 10/1998 | Dietle et al. | |
| 5,873,576 A | 2/1999 | Dietle et al. | |
| 6,007,105 A | 12/1999 | Dietle et al. | |
| 6,016,880 A | 1/2000 | Hall et al. | |
| 6,036,192 A | 3/2000 | Dietle et al. | |
| 6,109,618 A | 8/2000 | Dietle | |
| 6,120,036 A | 9/2000 | Kalsi et al. | |
| 6,227,547 B1 * | 5/2001 | Dietle et al. | 277/336 |
| 6,315,302 B1 | 11/2001 | Conroy et al. | |
| 6,334,619 B1 | 1/2002 | Dietle et al. | |
| 6,382,634 B1 | 5/2002 | Dietle et al. | |
| 6,416,225 B1 * | 7/2002 | Cioceanu et al. | 384/97 |
| 6,467,774 B1 * | 10/2002 | Amaral et al. | 277/579 |
| 6,494,462 B2 | 12/2002 | Dietle | |
| 6,554,016 B2 | 4/2003 | Kinder | |
| 6,561,520 B2 | 5/2003 | Kalsi et al. | |
| 6,685,194 B2 | 2/2004 | Dietle et al. | |
| 6,749,172 B2 * | 6/2004 | Kinder | 251/1.2 |
| 6,767,016 B2 | 7/2004 | Gobeli et al. | |
| 7,004,444 B2 * | 2/2006 | Kinder | 251/1.2 |
| 7,007,913 B2 * | 3/2006 | Kinder | 251/1.2 |
| 7,052,020 B2 | 5/2006 | Gobeli et al. | |
| 7,562,878 B2 | 7/2009 | Dietle et al. | |
| 7,770,898 B2 | 8/2010 | Dietle et al. | |
| 7,798,496 B2 | 9/2010 | Dietle et al. | |
| 7,934,545 B2 * | 5/2011 | Bailey et al. | 166/84.2 |
| 2003/0205864 A1 * | 11/2003 | Dietle et al. | 277/434 |
| 2006/0214379 A1 | 9/2006 | James et al. | |
| 2009/0001671 A1 | 1/2009 | Dietle et al. | |
| 2010/0259015 A1 | 10/2010 | Dietle | |
| 2010/0264603 A1 | 10/2010 | Schroeder | |

* cited by examiner

PRESSURE-BALANCED FLOATING SEAL HOUSING ASSEMBLY AND METHOD

CROSS-REFERENCE TO RELATED APPLICATIONS

This application claims the benefit of U.S. Provisional Appln. No. 61/283,227 filed Nov. 30, 2009, entitled "Seal Carrier," and claims the benefit of U.S. Provisional Appln. No. 61/284,179 filed Dec. 14, 2009, entitled "Pressure-Balanced Floating Seal Carrier." U.S. Provisional Appln. Nos. 61/283,227 and 61/284,179 are incorporated by reference herein for all purposes.

BACKGROUND OF THE INVENTION

1. Field of the Invention

The present invention pertains to rotary equipment that seals differential pressure. While applicable to many types of rotary equipment, it is believed to be particularly well suited for underbalanced oilfield drilling equipment of the type that is used for pressure control of wells while drilling. Such drilling equipment is called by various names such as rotary blowout preventer, rotary head, rotary diverter, and rotating control device.

The invention solves the type of problem that is described in conjunction with the laterally translatable seal housings of U.S. Pat. No. 5,195,754, entitled "Laterally Translating Seal Housing for a Drilling Mud Motor Sealed Bearing Assembly," and U.S. Pat. No. 6,227,547, entitled "High Pressure Rotary Shaft Sealing Mechanism." Unlike the prior art, the present invention does not require a stepped diameter shaft. It is therefore compatible with the reciprocating shafts found in rotating annular blowout preventers of the type shown in U.S. Pat. Nos. 5,588,491 and 5,662,171, which are titled "Rotating Blowout Preventer and Method." It also eliminates the need for two different seal diameters when pressure staging.

A high pressure rotary seal requires a small seal-to-housing extrusion gap clearance to avoid extrusion damage, yet the clearance must be large enough to avoid shaft-to-housing contact. If shaft-to-housing contact occurs at the extrusion gap, the housing assumes the load intended for the bearings. The resulting friction and heat can destroy the seal, and may damage the seal housing and the shaft sealing surface in ways that are highly detrimental to the effective life of the rotary seal.

Some of the optimum conditions for high pressure extrusion resistance are:
  Small extrusion gap clearance.
  Avoidance of heavily loaded contact between the seal housing and shaft, particularly at the region of intended extrusion gap clearance.
  Minimal relative radial motion between the seal housing and the shaft, to minimize dynamic changes to the size of the extrusion gap clearance.
  Minimal pressure induced deformation ("pressure breathing") of the extrusion gap clearance.
  An undamaged corner between the seal groove and the bore that defines the extrusion gap.
The implications of excessive shaft-to-housing clearance are:
  1 Pressure causes seal material to protrude into clearance.
  2 Runout and pressure breathing flex the protruding seal material.
  3 Cyclic strain destroys the protruding seal material.
  4 Pressure causes more protrusion.
  5 The damage cycle continues until sealing function is lost.

A number of factors prohibit a small extrusion gap clearance and precise shaft guidance in large machinery. Manufacturing tolerances are large, which directly affects the size of the shaft-to-housing clearance, and also increases bearing mounting and internal clearances, which all permit shaft runout and misalignment. Large components are often subject to significant elastic deformation when exposed to high pressure and large mechanical loads, and are often subject to significant dimensional variability from differential thermal expansion and contraction caused by seal and bearing heat. Such dimensional variability can have a dramatic affect on assembly clearances and bearing internal clearances, and must be taken into account to prevent seizing.

Surface speeds can be significant in large diameter equipment, which adds to seal-generated heat. This softens the seal material, and reduces seal extrusion resistance.

For annular blowout preventers having non-floating seal housings, it is necessary that stack alignment be essentially perfect. However, as can be seen, for example, in U.S. Pat. Nos. 5,588,491 and 5,662,171, there is often much potential in the prior art for misalignment between the lower shaft and the seal housing. In the above-referenced patents, the shaft for the lower rotary seal is an extension of a large reciprocating piston that actuates the packer element. This large piston is necessarily mounted with enough clearance for sliding, which adds to its potential for misalignment. The piston is a two-piece assembly, which also adds to the potential for misalignment of the sealing surface. The piston is hydraulically thrust against the packer element to actuate the packer element. The packer element deforms in uneven fashion against a drillstring. The drillstring is in all likelihood misaligned with the blowout preventer, and not running true. This imposes severe cocking loads on the reciprocating piston, causing misalignment and runout that can cause heavily loaded contact at the extrusion gap that is likely to cause rotary seal, shaft, and seal housing damage.

As a general conclusion concerning large equipment such as rotary blowout preventers, if clearance is in a useful range for extrusion resistance, it is virtually impossible to guide the shaft so precisely that it will not rub on the bore of a conventional non-floating seal housing. This rubbing creates seal-damaging heat, and may also damage the seal housing and shaft in ways that significantly accelerate rotary seal extrusion damage.

In addition, in rotary blowout preventers, internal fluid within the unit is often pressurized for various reasons. One reason for internal fluid pressure is to actuate the packer element. Another reason for fluid pressure is to orient the rotary seal that partitions the internal fluid from the drilling fluid.

There are various methods of producing and controlling the pressure of a fluid within a machine. One form of pressure supply circulates the fluid through a computer-controlled valve that creates back-pressure. For example, U.S. Pat. No. 6,554,016 teaches controlling the pressure of a circulating fluid by creating back-pressure with pinch valves, in order to control a packing element of a blowout preventer and to orient the rotary seal that partitions the fluid from the drilling fluid. The wellbore pressure is sensed with a pressure transducer, and a computer controls the orifice size of the pinch valve to maintain a fluid pressure that is a desired amount greater than the pressure of the wellbore. In such systems, the circulation can be produced with fixed displacement pumps. The computer-controlled pressurization system described in U.S. Pat. Nos. 5,178,215 and 5,224,557, for example, sense the pressure of the drilling fluid, and then control the pressure of the circulating fluid with a variable speed pump.

A pressure supply can sometimes also take the form of a simple differential area piston. The use of a differential area piston to supply a fluid pressure that is greater than the drilling fluid pressure is shown, for example, in FIG. 3 of commonly assigned U.S. Pat. No. 6,007,105, entitled "Swivel Seal Assembly." Pressure is amplified by a piston area ratio. The same type of differential area piston-type pressure amplification arrangement is shown by FIG. 3-31 of the publicly available "Kalsi Seals Handbook," Revision 1, and is described in the accompanying text. A spring acts axially on the differential area piston to supply some level of lubricant pressure even when drilling fluid pressure is absent.

SUMMARY OF THE INVENTION

The preferred embodiment of the invention is a seal housing arrangement for high differential pressure rotary seals that uses applied pressure to provide hydraulic force balance in the axial direction, which frees the seal housing to translate laterally to follow shaft deflection and runout. Unlike the prior art, the seal housing of the present invention does not require a step in shaft diameter, and is therefore compatible with reciprocating shafts. If desired, a simple piston type pressurization system can be used to produce the applied pressure.

One embodiment of the present invention is a dynamic sealing mechanism for a machine assembly that includes a seal housing of generally cylindrical form having opposed ends. The seal housing may be axially positioned between a pressure housing and a retaining member, and may be laterally translatable relative to the pressure housing. The dynamic sealing mechanism may preferably further include a shaft located at least partially within the seal housing, where the shaft has a sealing surface of generally cylindrical form and is relatively movable with respect to the seal housing, as well as at least one radial bearing positioned radially by the shaft and locating the radial position of the seal housing. At least one dynamic seal may establish a sealed relationship between the seal housing and the sealing surface of the shaft, and at least three fluid pressure-generated forces may act axially on the seal housing to produce a net fluid pressure-generated axial force. Preferably, the at least three fluid pressure-generated forces may include first and second fluid pressure-generated forces acting axially on the seal housing, the second fluid pressure-generated force acting in opposition to the first fluid pressure-generated force, and a fluid pressure-generated balancing force acting axially on the seal housing. The fluid pressure-generated balancing force preferably has a magnitude and direction causing the net fluid pressure-generated axial force to be negligible.

Another embodiment of the present invention includes a method of balancing a floating seal housing assembly in a rotary machine, where the seal housing is exposed at a first end to a first fluid and at a second end to a second fluid. The method includes the step of applying to a portion of the seal housing a balancing fluid designed and configured to neutralize the net axial force acting on the seal housing as a result of exposure to the first and second fluids.

BRIEF DESCRIPTION OF THE SEVERAL VIEWS OF THE DRAWINGS

So that the manner in which the above recited features of the present invention are attained and can be understood in detail, a more particular description of the invention, briefly summarized above, may be had by reference to the embodiments thereof that are illustrated in the appended drawings. It is to be noted, however, that the appended drawings only illustrate preferred embodiments of this invention, and are therefore not to be considered limiting of its scope, for the invention may admit to other equally effective embodiments that vary only in specific detail.

In the drawings.

DETAILED DESCRIPTION OF THE INVENTION

Figure 1:
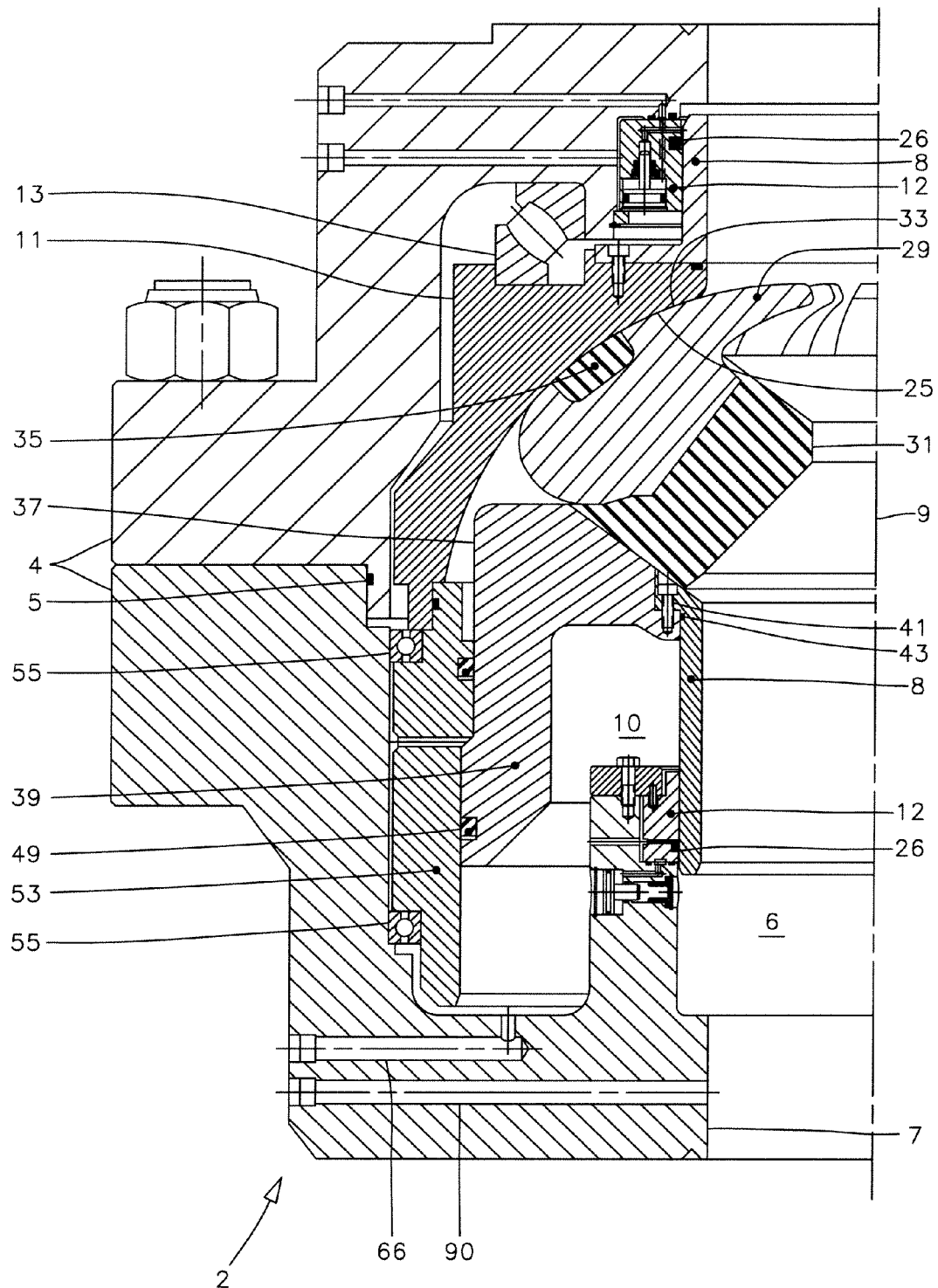
FIG. 1 is a schematic view, partially in cross-section, of a rotating blowout preventer incorporating pressure-balanced floating seal housings according to a preferred embodiment of the present invention.

Description of FIG. 1

Features throughout this specification that are represented by like numbers have the same basic function. FIG. 1 shows a fragmentary view of a rotating blowout preventer that incorporates embodiments of the pressure-balanced floating seal housing of the present invention. The drawing illustrates a rotating annular blowout preventer of the general type shown in U.S. Pat. Nos. 5,588,491 and 5,662,171. It is to be understood, however, the invention is applicable to other types of machine assemblies, including but not limited to other types of rotating control devices used for control of well pressure while drilling.

The machine assembly 2 may contain or be exposed to a first fluid 6 at pressure Pw. For purposes of this specification, the term fluid has its broadest possible meaning and encompasses both liquids and gases. In a rotating blowout preventer, the first fluid 6 may typically be drilling fluid. A pressure housing 4 may contain a second fluid 10, such as a hydraulic fluid, for the lubrication and actuation of relatively movable components of the machine assembly 2.

The pressure housing 4 may be comprised of upper and lower housings, as shown, that each have mating flanges for threaded fasteners, as shown. A static seal 5 may provide sealing between the upper and lower housings 4. Oppositely facing pressure housing ends may provide surfaces for engaging and sealing with respect to other connecting oilfield equipment. Each of those ends may preferably incorporate a groove for a ring gasket. Each end surface may preferably also include a circle of tapped holes (not shown) for connecting with the other oilfield equipment. It is understood that additional non-illustrated pressure passages can be used, if desired, to move the reciprocatable piston 37 in a downward direction to open the packer element 31.

The second fluid 10 may be supplied to the machine assembly 2 through a hole 66, and may preferably be controlled relative to the pressure Pw of the first fluid 6. The pressure Pc of the second fluid 10 may preferably be maintained at a value in the range of about 200 to 500 psi greater than that of the pressure Pw of the first fluid 6. The pressure Pw of the first fluid 6 may, if desired, be measured via hole 90.

The pressure housing 4 establishes a theoretical centerline 9 which is generally coaxial with the axis of a tubular passing through the machine assembly 2. The housing may 4 define a through bore 7 that establishes the maximum tubular size that may be used in conjunction with the machine assembly 2.

In the illustrated embodiment of FIG. 1, the machine assembly 2 may incorporate a rotatable inner housing 11 that is guided for rotation by a bearing 13 which may preferably have radial and axial capacity, and may also be guided for rotation by virtue of a fit with a bearing guided adapter ring 53. The upper race of bearing 13 may be guided and supported by engagement with the housing 4, and the lower race may guide the rotatable inner housing 11. The rotatable inner housing 11 may preferably incorporate a curving surface 25, which is preferably a portion of a sphere that is substantially aligned with the centerline 9.

A packer assembly may be incorporated within the rotatable inner housing 11 that incorporates a number of circumferentially distributed metal elements 29 and also an annular elastomeric packer element 31 that includes an outer sealing element 35. Each of the several metal elements 29 may have a curving outer surface 33 for sliding with respect to the curving surface 25. The inner portion of the packer element 31 may establish sealing engagement with the tubular (not shown), while the outer sealing element 35 may establish a sealed relationship with respect to the rotatable inner housing 11. The packer element 31 may also be in sealing engagement with the metal elements 29.

Upper and lower shafts 8, seal housings 12, and dynamic seals 26 may preferably be provided. The dynamic seals may seal with respect to the shafts 8 and the seal housings 12. The seal housings 12 may be sealed with respect to the housing 4.

The machine assembly 2 incorporates a riciprocatable piston 37 which may comprise an outer skirt 39 and the lowermost shaft 8. The components may be connected to each other via cap screws 41 and may be sealed with respect to each other by a static seal 43 (alternately, the piston could be made as a once piece component). The riciprocatable piston 37 may be mounted within the adapter ring 53 that is rotatably mounted with respect to the housing by upper and lower bearings 55. The upper surface of the riciprocatable piston 37 may preferably be configured for engaging the packer element 31. Upward movement of the riciprocatable piston 37 closes the bore of the packer element 31, while downward movement of the riciprocatable piston 37 opens the bore of the packer element 31. The pressure Pw of the second fluid 10 may be used to move the reciprocatable piston 37 toward the rotatable inner housing 11 and close the packer element around the tubular (the tubular is not shown). The reciprocatable piston 37 is illustrated at a location that is near the end of its upward stroke. When the packer element 31 is rotating because it is in sealed engagement with a tubular, the riciprocatable piston 37 and the adapter ring 53 may also rotate. A sliding seal 49 may prevent the pressure Pw of the second fluid 10 from escaping through the clearance between the riciprocatable piston 37 and the adapter ring 53. The lowermost dynamic seal 26 may prevent the pressure Pw of the second fluid from escaping through the clearance between the lower seal housing 12 and the lower shaft 8.

Figure 1A:
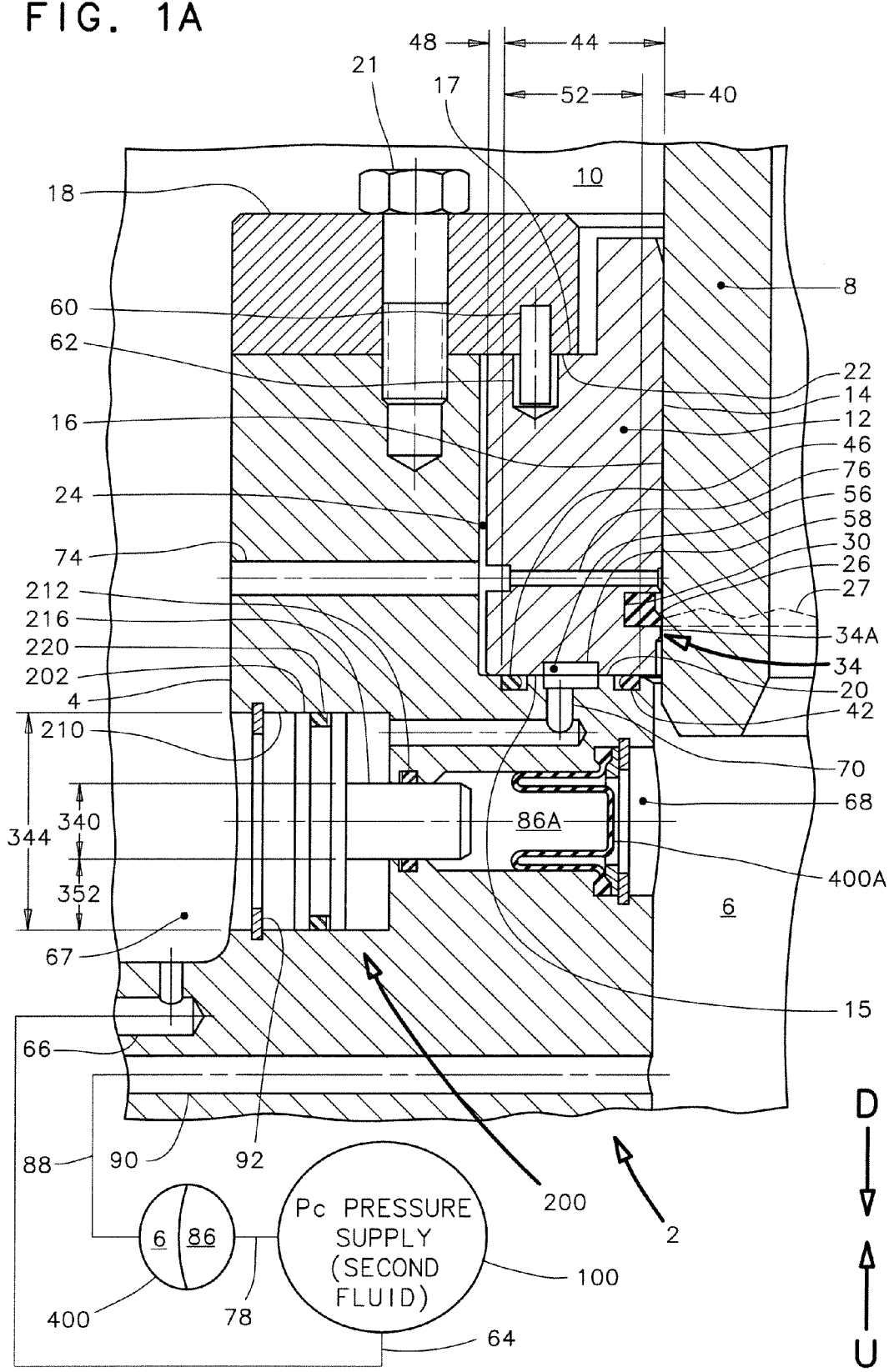
FIG. 1A is a partial cross-sectional view of a pressure-balanced floating seal housing according to a preferred embodiment of the present invention, including a stepped piston pressure supply.

Description of FIG. 1A

FIG. 1A shows an alternative fragmentary view of an embodiment of the present invention. For convenience, the subject matter is illustrated as a rotating annular blowout preventer of the general type shown in U.S. Pat. Nos. 5,588,491 and 5,662,171. It is to be understood, however, that the invention is applicable to other types of machine assemblies including, but not limited to, other types of rotating control devices used for control of well pressure while drilling.

The machine assembly 2 includes a pressure housing 4 that contains or is exposed to a first fluid 6. In a rotating blowout preventer, the first fluid 6 is typically drilling fluid. The first fluid 6 is at pressure Pw.

A portion of a shaft 8 is located within the pressure housing 4, and is capable of rotation relative to the pressure housing 4. In a rotating annular blowout preventer of the general type shown in U.S. Pat. Nos. 5,588,491 and 5,662,171, the shaft 8 is also capable of axial movement relative to the pressure housing 4.

The pressure housing 4 contains a second fluid 10, such as a lubricant for the lubrication and/or actuation of relatively movable components of the machine assembly 2. The second fluid 10 is at pressure Pc. In equipment such as a rotating annular blowout preventer, the pressure Pc of the second fluid 10 may also be used as a hydraulic control pressure. For example, in an active-type rotating blowout preventer, the pressure Pc of the second fluid 10 is used to actuate a packer element around a drill string. For a more specific example, in the general type of blowout preventer that is shown in U.S. Pat. Nos. 5,588,491 and 5,662,171, the pressure Pc of the second fluid 10 is used to create axially acting hydraulic force that causes the shaft/piston to move back and forth in order to close an annular blowout preventer packer element around a drill string. For another example, in U.S. Pat. No. 5,279,365, hydraulic pressure causes an outer packer to urge an elastomeric inner packer radially inward against the drillstring, without requiring an axially moving piston. The teachings of FIG. 1 are applicable where the pressure Pc of the second fluid 10 is typically greater than or equal to the pressure Pw of the first fluid 6. For example, the arrangement could also be used where the first fluid 6 is at atmospheric pressure and the second fluid 10 is a pressurized lubricant.

At least one seal housing 12 is provided that has a radial bearing-type relationship with the shaft 8. In FIG. 1, the bearing-type relationship is achieved by a journal bearing bore 14, which has a close, journal bearing-type guiding fit with a relatively movable surface 16 of the shaft 8. Other types of bearings, such as rolling element bearings, can be used in place of the journal bearing bore 14 without departing from the spirit or scope of the invention. Because of the radial bearing relationship and the axial hydraulic force balancing described below, the seal housing 12 is capable of being positioned laterally by the shaft 8.

The seal housing 12 has a first housing end 15 that faces generally toward the first fluid 6, and has a second housing end 17 that faces generally toward the second fluid 10.

A housing retaining member 18 of any suitable configuration is provided to capture the seal housing 12. More specifically, the seal housing 12 is located axially by a first retaining surface 20 and a second retaining surface 22. As shown, the first retaining surface 20 can be defined by the pressure housing 4, and the second retaining surface 22 can be defined by the housing retaining member 18. The housing retaining member 18 and the pressure housing 4 preferably define an annular recess 24 within which the seal housing 12 is situated. The housing retaining member 18 is retained to the pressure housing 4 by one or more retention feature 21, such as a spatially arranged plurality of threaded fasteners.

The seal housing 12 incorporates a dynamic seal 26. It is preferred that dynamic seal 26 in FIG. 1, and in other figures herein, be a hydrodynamic seal such as those sold by Kalsi Engineering, Inc. under the registered trademark "KALSI SEALS®." The dynamic interface of such seals is lubricated in response to relative rotation, as the result of the special hydrodynamic lubrication features of "KALSI SEALS®." These hydrodynamic features can be broadly characterized as establishing a sealing footprint against the relatively movable surface 16, wherein the footprint has a wavy footprint edge 27 that faces the second fluid 10. In FIG. 1, the seal footprint is shown in hidden line representation.

Examples of such seals are provided in U.S. Pat. Nos. 4,610,319; 5,195,754; 5,230,520; 5,678,829; 5,738,358; 5,823,541; 5,873,576; 6,007,105; 6,036,192; 6,109,618; 6,120,036; 6,227,547; 6,315,302; 6,334,619; 6,382,634; 6,494,462; 6,561,520; 6,685,194; 6,767,016; 7,052,020; and 7,562,878. Among these, the seals disclosed by U.S. Pat. No. 7,562,878, entitled "Low Torque Hydrodynamic Lip Geometry for Bi-Directional Rotation Seals," are preferred because of their low running torque and heat generation characteristics, and the ability to handle high differential pressure with thin viscosity lubricants.

The dynamic seal 26 is preferably located and held in compressed relation with the relatively movable surface 16 of the shaft 8 by a seal groove 30. Adjacent to the dynamic seal 26 (and the seal groove 30), seal housing 12 includes clearance surface 34A defining a clearance with the relatively movable surface 16. This clearance is identified as extrusion gap 34. The clearance at the extrusion gap 34 is slightly larger than the clearance of the bearing arrangement, and therefore the clearance surface 34A cannot contact the relatively movable surface 16. This prevents the seal-damaging heat near the dynamic seal 26 that might otherwise result if contact were permitted between the clearance surface 34A and the relatively movable surface 16. It also protects the clearance surface 34A, and the relatively movable surface 16 from contact-related damage.

The first fluid 6 is contained by the dynamic seal 26 and by an inner sliding seal 42. The second fluid 10 is retained by the dynamic seal 26 and by an outer sliding seal 46. The sliding seals 42 and 46 are preferably face sealing arrangements (as shown), where a sealing element is located by a groove and compressed axially into sealing engagement with a mating surface. The grooves that mount the sliding seals can be cut into the pressure housing 4 (as shown) or into the seal housing 12. The inner sliding seal 42 and outer sliding seal 46 are preferably treated or coated to minimize breakout friction. It is preferred that the magnitude of pressure Pc of the second fluid 10 be greater than the magnitude of pressure Pw of the first fluid 6, to prevent skew-induced wear of the dynamic seal 26. Skew-induced wear is described in U.S. Pat. No. 6,315, 302.

The pressure Pw of the first fluid 6 acts over the effective area 40 that is established by dynamic seal 26 and inner sliding seal 42, and imparts an axially acting hydraulic thrust on the seal housing 12, acting in direction U. The pressure Pc of the second fluid 10 acts over the effective area 44 that is established by dynamic seal 26 and outer sliding seal 46, and imparts an axially acting hydraulic thrust on the seal housing 12, acting in direction D. The pressure Pc of the second fluid 10 also acts over the area 48 on both ends of the seal housing 12, and imparts equal and opposed axially acting hydraulic thrusts on the seal housing 12; being equal and opposite the hydraulic forces effectively cancel each other.

A sealed balancing area 52 is defined by inner sliding seal 42 and outer sliding seal 46. A balancing fluid 56 at pressure Pb is communicated to the sealed balancing area 52, and exerts a hydraulic force on the seal housing 12 in direction U. The pressure Pb is preferably maintained at a magnitude that is greater than or equal to the magnitude of pressure Pc and pressure Pw.

The balancing fluid 56 is preferably distributed circumferentially around the first end of the seal housing 12 by a distribution channel 58. The distribution channel 58, which is preferably circular, can be formed into pressure housing 4 and/or the seal housing 12. The purpose of the distribution channel 58 is to facilitate the rapid application of pressure Pb to the sealed balancing area 52.

The sliding seals throughout this specification can be compression-type elastomer seals if desired. With compression-type elastomer seals the pressure acts throughout the elastomer as if the elastomer were a fluid. This means that the effective pressure boundary is established at the seal groove wall that is closest to the lowest fluid pressure. With other types of seals, such as flexing lip-type seals, the effective pressure boundary can be determined, but is not necessarily located at a gland wall.

It is preferred that the hydraulic forces acting in direction U from pressure Pw and pressure Pb be substantially equal, or at least roughly equal, to the hydraulic forces acting in direction D from pressure Pc. Because of this axial hydraulic force balance situation, the seal housing 12 is relatively free to slide laterally to accommodate lateral misalignment of the shaft 8.

In addition to the above-described axial force balance condition, the seal housing 12 is substantially pressure-balanced in the radial direction. This makes it relatively immune from pressure breathing (i.e., differential pressure-induced expansion). As shown in FIG. 1A, the radial pressure balance situation is due to the fact that pressure Pc acts radially inward along the entire length of the seal housing 12, and acts radially outward along most of the length of the seal housing 12. This condition of substantial radial pressure balance makes seal housing 12 particularly suitable for large diameter equipment, because it stabilizes the radial clearance between seal housing 12 and the relatively movable surface 16 at the extrusion gap 34.

Any suitable anti-rotation means can be used to keep the seal housing 12 from rotating with the shaft 8. For example, an anti-rotation projection 60 could project into a mating anti-rotation recess 62. Although the anti-rotation projection 60 is illustrated in FIG. 1A as being mounted to the housing retaining member 18, and the anti-rotation recess 62 is shown to be situated in the seal housing 12, the anti-rotation projection 60 could just as easily be mounted to (or form a part of) the seal housing 12, and the mating anti-rotation recess 62 could just as easily be a feature of the housing retaining member 18. Likewise, the anti-rotation projection 60 and the mating anti-rotation recess 62 could be radially configured, rather than the axial configuration that is shown. The anti-rotation engagement could alternately be configured to be between the seal housing 12 and the pressure housing 4, if desired.

The pressure Pc of the second fluid 10 can be provided by any suitable Pc pressure supply 100, such as, but not limited to, the types of pressure supplies described in conjunction with the prior art. One form of a suitable Pc pressure supply 100 would be one of the computer-controlled pressure supplies described herein in conjunction with the prior art, where a hydraulic fluid is circulated through an orifice. Either the orifice size or the flow rate is varied to appropriately vary the pressure Pc. Another example of a suitable Pc pressure supply 100 would be the differential area piston arrangement described herein in conjunction with the prior art.

The pressure Pc can be transmitted from the Pc pressure supply 100 by any suitable means, such as the pressure communication path 64. In FIG. 1A, the pressure communication path 64 is illustrated as including a cross-drilled hole 66. The pressure enters fluid cavity 67, and reaches the dynamic seal 26 via a cross-drilled hole 74, the annular recess 24, and fluid path 76.

To maintain the pressure Pc of the second fluid 10 at its preferred value, it is preferred that the operation of the Pc pressure supply 100 be controlled in relation to the pressure Pw of the first fluid 6. If the Pc pressure supply 100 is a computer-controlled pressurization system, the pressure Pw can be sensed with a pressure transducer that conveys the pressure information to the Pc pressure supply 100 via an electrical path. If the Pc pressure supply 100 is a hydraulically-controlled pressurization system, the pressure Pw is conveyed to the Pc pressure supply 100 hydraulically via a fluid path. In FIG. 1A, the electrical or hydraulic path is represented as control path 78. If the control path 78 is an electrical path, it is understood that it includes a pressure transducer. If the control path 78 is a hydraulic path, it is understood that it takes the form of a fluid conduit.

If the first fluid 6 is drilling fluid, it is preferable to protect the pressure transducer or hydraulic path from the drilling fluid using a fluid separator 400 that separates the first fluid 6 from a clean fluid 86 while imparting pressure Pw to the clean fluid 86. The fluid separator 400 can take any suitable form including a piston-type separator, but the preferred form uses a bladder or diaphragm because that type of separator has less hysteresis. The fluid separator 400 is exposed to the first fluid 6 through a pressure communication path 88 of any suitable form. The length of the pressure communication path 88 should preferably be as short as possible. In FIG. 1A, part of the pressure communication path 88 is illustrated as a drilled hole 90. Preferably, the fluid separator 400 would be mounted directly to the machine assembly 2 so that the length of the pressure communication path 88 is limited to the drilled hole 90.

The pressure Pb of the balancing fluid 56 can be provided by any suitable Pb pressure supply 200. One example of a suitable Pb pressure supply 200 would be a differential area piston arrangement. In the preferred embodiment shown in FIGS. 1 and 1A, a differential area piston arrangement is illustrated. The pressure Pb can be transmitted from the Pb pressure supply 200 by any suitable means, such as the pressure communication path 70 shown in FIG. 1A.

To maintain pressure Pb at its preferred value, it is preferred that the operation of the Pb pressure supply 200 be partly controlled by pressure Pc of the second fluid 10. If the Pb pressure supply 200 is a hydraulically-controlled pressurization system as shown in FIGS. 1 and 1A, the pressure Pc is communicated to the Pb pressure supply 200 hydraulically via a fluid path, as shown.

To maintain pressure Pb at its preferred value, it is preferred that the operation of the Pb pressure supply 200 also be partly controlled by pressure Pw of the first fluid 6. If the Pb pressure supply 200 is a hydraulically-controlled pressurization system as shown, the pressure Pw is communicated to the Pb pressure supply 200 hydraulically.

In an alternative embodiment, the Pb pressure supply 200 may be a computer-controlled pressure supply that generates pressure by circulating fluid through an orifice, with the orifice and/or circulation rate being a computer-controlled variable. If the Pb pressure supply is a computer-controlled pressurization system, the pressure Pc can be sensed with a pressure transducer that conveys the pressure information to the pressure supply via an electrical path. The pressure Pw can be sensed with a pressure transducer that conveys the pressure information to the pressure supply via an electrical control path.

If the first fluid 6 is drilling fluid or other difficult fluid, it is preferable to protect the piston arrangement (discussed below) from the first fluid 6 using a fluid separator 400A that separates the first fluid 6 from a clean fluid 86A while imparting pressure Pw to the clean fluid 86A. The fluid separator 400A can take any suitable form including a piston-type separator, but the preferred form uses a bladder or diaphragm. The fluid separator 400A is exposed to the first fluid 6 through a pressure communication path 68 of any suitable form.

In the machine assembly 2 of FIG. 1, the hydraulic pressures that produce axially acting force on the seal housing 12 act over certain areas, as described above. The axially acting hydraulic forces are equal to pressure times area. Pressure Pw acts on the seal housing 12 on the effective area 40, producing a force in direction U that is equal to pressure Pw times effective area 40. Pressure Pc acts on the seal housing 12 over the effective area 44 and produces a force in direction D. Pressure Pb acts on the seal housing 12 on the balancing area 52 producing a force in direction U that is equal to pressure Pb times balancing area 52.

To facilitate laterally sliding movement of the seal housing 12 in response to the radial motion of the shaft 8, the aforementioned forces acting in direction U and direction D should be substantially equal. In some cases these forces may include not only the aforementioned hydraulic forces, but the weight of the seal housing 12 and the compressive force of the sliding seals 42 and 46, but these latter forces are typically negligible and only the hydraulic forces typically need to be taken into account. Whether one is only balancing the hydraulic forces, or also balancing other forces such as, but not limited to, seal housing weight and seal compressive force, it can be accomplished in the present invention by proper sizing of the magnitude of the balancing pressure Pb.

In FIG. 1A, the aforementioned forces acting in direction U and direction D are substantially equal due to the proportions of the sealed areas of the Pb pressure supply 200 relative to the sealed areas of the seal housing 12.

In the Pb pressure supply 200 of FIGS. 1 and 1A, a stepped piston 202 establishes a first hydraulic area 340 by virtue of a first reciprocating seal 212 that establishes sealing between the stepped piston 202 and the surrounding structure. In FIG. 1A, the first reciprocating seal 212 is shown as a rod-type seal having a sealed relationship with a piston rod 216. The same thing could be accomplished by a piston-type seal having a sealed relationship with a mating bore. In FIG. 1A, the surrounding structure is formed by the pressure housing 4 of the machine assembly 2, but it could alternately be defined by a separate housing arrangement that is separable from the pressure housing 4 of the machine assembly 2, or even located remotely from the pressure housing 4.

The stepped piston 202 establishes a second hydraulic area 344 by virtue of a third reciprocating seal 220, here shown as a piston-type seal having a sealed relationship with a mating bore 210. The mating bore 210 can be defined integrally with the pressure housing 4 of the machine assembly 2 as shown, or it can be defined by a separate housing arrangement that is separable from the pressure housing 4 of the machine assembly 2, or even located remotely from the pressure housing 4.

The hydraulic area 352 is the difference between the second hydraulic area 344 and the first hydraulic area 340. In other words, hydraulic area 352 is equal to hydraulic area 344 minus hydraulic area 340. Thus, the Pb pressure supply 200 establishes hydraulic areas 340, 344, and 352. In FIG. 1A, hydraulic area 352 is the transverse area between bore 210 and piston rod 216.

The pressure Pw and pressure Pc impart axially acting force to the stepped piston 202 that produces the desired pressure Pb. The pressure Pb is conducted by pressure supply 200 to balancing area 52 via the pressure communication path 70.

Preferably, the hydraulic area 340, hydraulic area 344, and hydraulic area 352 of the Pb pressure supply 200 have certain proportions with respect to each other. The defined effective area 40, effective area 44, and balancing area 52 of the seal housing 12 also have certain proportions with respect to each other. If the area proportions of the Pb pressure supply 200 are substantially the same as the area proportions of the seal housing 12, the pressure Pb that is generated by the Pb pressure supply 200 will be substantially correct to balance the axially acting hydraulic forces on the seal housing 12.

In other words, hydraulic area 340 divided by hydraulic area 352 is preferably substantially equal to effective area 40 divided by balancing area 52, and hydraulic area 344/(hydraulic area 340+hydraulic area 352) is substantially equal to effective area 44/(effective area 40+balancing area 52).

Yet another way of saying this is that pressure Pw and pressure Pc push on the stepped piston 202 in the same proportions that pressure Pw and pressure Pc push on the seal housing 12. Because the stepped piston 202 can slide, the pressure Pb is raised to a level that balances the forces acting on the stepped piston 202. The level of pressure Pb that is produced by the Pb pressure supply 200 is equal to (pressure Pc×hydraulic area 344−pressure Pw×hydraulic area 340)/hydraulic area 352. The amount of pressure Pb required to axially force balance the seal housing 12 is equal to (pressure Pc×effective area 44−pressure Pw×effective area 40)/balancing area 52.

If the hydraulic area proportions of the Pb pressure supply 200 are equal to the hydraulic area proportions of the seal housing 12, and if Newtonian fluids are used, the only deviation from generating the theoretically perfect pressure Pb will primarily be due to friction of the first reciprocating seal 212 and the third reciprocating seal 220. To minimize the friction of the first reciprocating seal 212 and the third reciprocating seal 220, they can be treated or coated with a friction reducing substance.

As shown in FIG. 1A, an internal shoulder 92 is preferably provided to limit piston movement in the event of temporary failure of the Pc pressure supply 100. While the shoulder 92 is illustrated as a retaining ring, it can take other forms.

If desired, the areas in the Pb pressure supply 200 of FIG. 1A can be modified slightly to also balance out other forces acting on seal housing 12, such as the weight of the seal housing 12 and face sealing compressive force. Such a fine degree of balancing is not normally necessary, however, because the dominant axially acting forces on the seal housing 12 of FIG. 1 are typically the hydraulic forces, because the pressures of the various fluids may be quite high.

Figure 2:
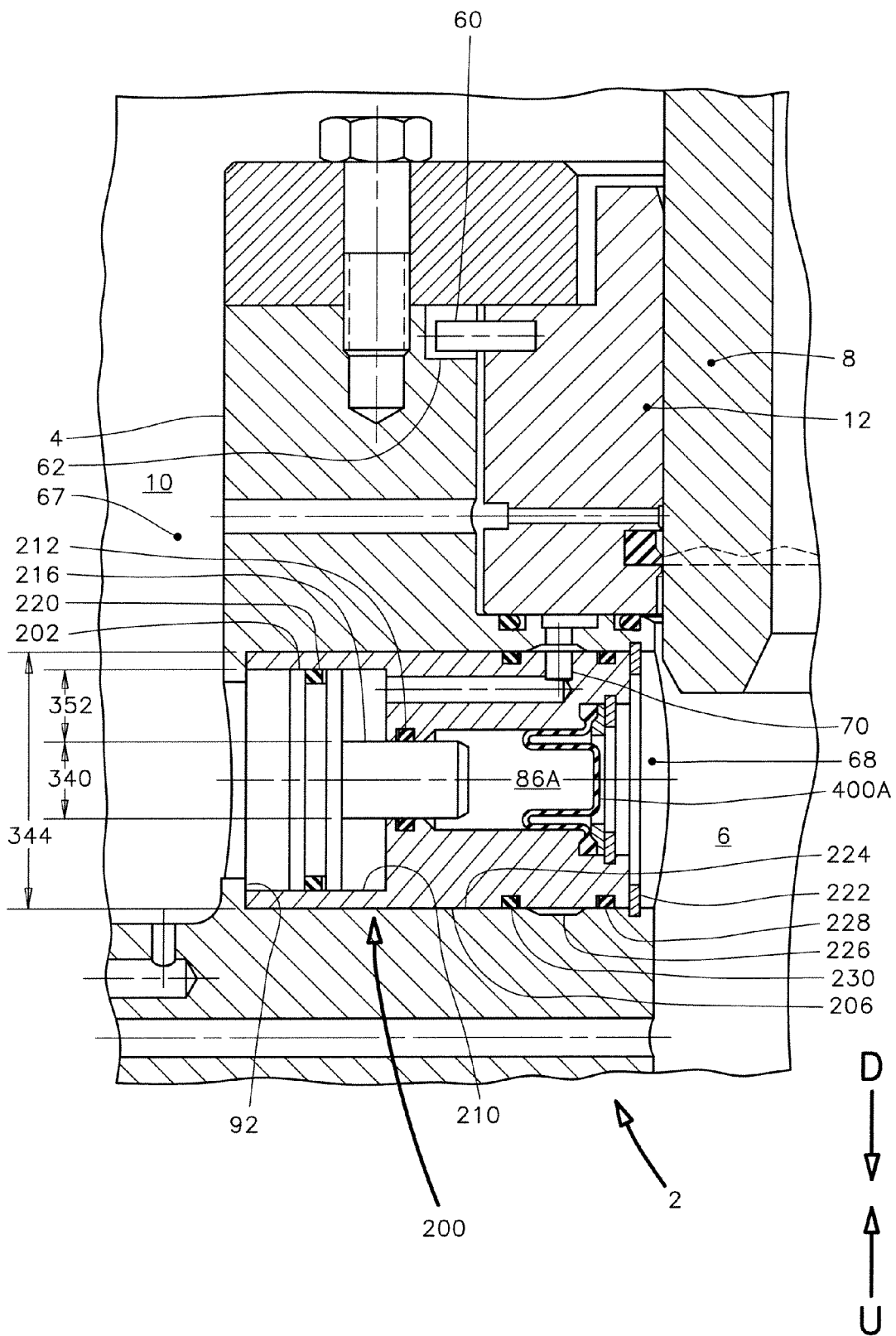
FIG. 2 is a partial cross-sectional view of an alternative embodiment of the pressure-balanced floating seal housing of the present invention, including a modular stepped piston pressure supply cylinder arrangement that is removable from the pressure housing.

Description of FIG. 2

In FIGS. 2 to 9, various features of the seal and machine components are labeled to orient the reader, bearing in mind that features throughout this specification that are represented by like numbers have the same basic function. FIG. 2 shows a fragmentary view of a machine assembly generally at 2 that includes a pressure housing 4 containing or exposed to a first fluid 6 and a second fluid 10. The machine assembly of FIG. 2 is essentially the same as shown in FIG. 1A. The only differences are that the Pb pressure supply 200 is a removable canister-type arrangement rather than an integral arrangement, and the anti-rotation engagement is radial rather than axial.

Any suitable anti-rotation means can be used to keep the seal housing 12 from rotating with the shaft 8. As shown, an anti-rotation projection 60 projects radially from the seal housing 12 into a mating anti-rotation recess 62.

The Pb pressure supply 200 is a differential area piston arrangement that includes a hydraulic cylinder 206. The Pb pressure supply 200 is secured to the pressure housing 4 with a securing device 222, such as the retaining ring that is shown. In FIG. 2, the Pb pressure supply 200 fits within a recess 224 between an internal shoulder 92 and the securing device 222. The securing device 222 can take other forms, such as a pattern of bolts, or a threaded connection.

If the first fluid 6 is drilling fluid or other difficult fluid, it is preferable to protect the piston arrangement from the first fluid 6 using a fluid separator 400A that separates the first fluid 6 from a clean fluid 86A while imparting pressure Pw to the clean fluid 86A. The fluid separator 400A can take any suitable form including a piston-type separator, but the preferred form uses a bladder or diaphragm as shown. The fluid separator 400A is exposed to the first fluid 6 through a pressure communication path 68 of any suitable form.

In the Pb pressure supply 200 of FIG. 2, the stepped piston 202 establishes a first hydraulic area 340 via a first reciprocating seal 212 that establishes sealing between the stepped piston 202 and the surrounding structure of hydraulic cylinder 206. The stepped piston 202 establishes a second hydraulic area 344 via a third reciprocating seal 220. The hydraulic area 352 is the difference between the second hydraulic area 344 and first hydraulic area 340.

The Pb pressure supply 200 establishes hydraulic areas that function in the same manner described previously in conjunction with FIG. 1A to produce pressure Pb. Pressure Pw of the first fluid 6 and pressure Pc of the second fluid 10 impart axially acting force to the stepped piston 202 that produces the desired pressure Pb. The pressure Pb can be transmitted from the Pb pressure supply 200 by any suitable means, such as the pressure communication path 70 that is shown. The pressure communication path 70 is partly defined by an annular groove 226 and first and second communication path seals 228 and 230.

Figure 3:
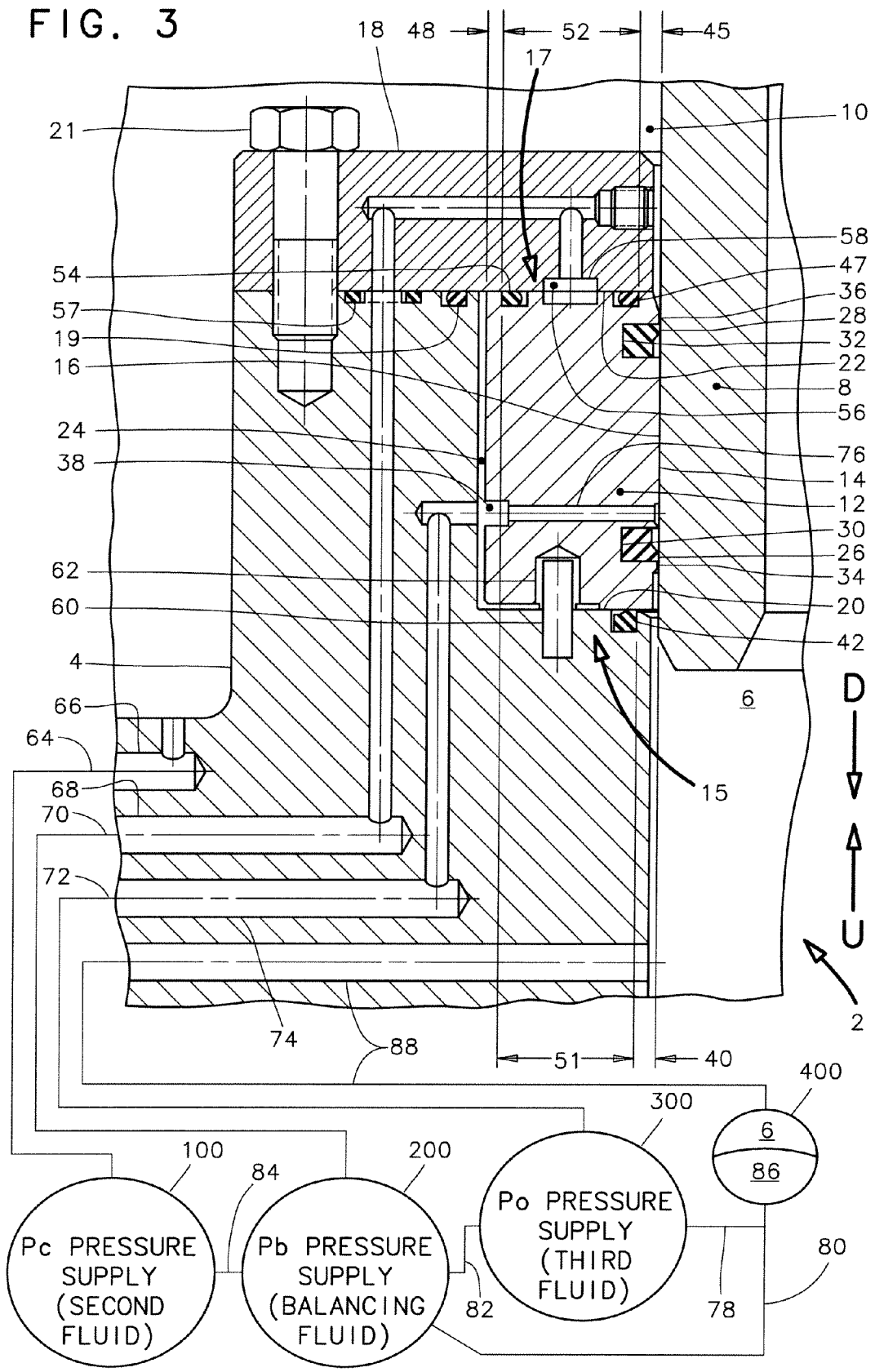
FIG. 3 is a cross-sectional view of another embodiment of the pressure-balanced floating seal housing of the present invention, where the pressure supply is exterior to the pressure housing.

Description of FIG. 3

It can be appreciated that any number of pressures acting on a seal housing can be accommodated with a suitable piston area arrangement. It can also be appreciated that the piston can be mounted exterior to the pressure housing if desired. FIG. 3 shows a fragmentary view of a machine assembly generally at 2. For the purpose of illustration, the subject matter of FIG. 3 is illustrated as a rotating annular blowout preventer of the general type shown in U.S. Pat. Nos. 5,588, 491 and 5,662,171 and FIG. 1 herein.

The machine assembly 2 includes a pressure housing 4 that contains or is exposed to a first fluid 6 at pressure Pw and surrounds a portion of a shaft 8 which is capable of rotation and axial reciprocation relative to the pressure housing 4.

The pressure housing 4 contains or is exposed to a second fluid 10, such as a lubricant for the lubrication of relatively movable components of the machine assembly 2. The second fluid 10 is at pressure Pc, and may be used for hydraulic control. For example, in an active-type rotating blowout preventer, the pressure Pc of the second fluid 10 is used to actuate a packer element around a drill string.

At least one seal housing 12 is provided that has a radial bearing-type relationship with the shaft 8. In FIG. 3, a journal bearing bore 14 has a close guiding fit with a relatively movable surface 16 of the shaft 8. Other bearing arrangements can be used if desired. The seal housing 12 has a first housing end located generally at 15, and has a second housing end located generally at 17.

A housing retaining member 18 captures the seal housing 12. More specifically, the seal housing 12 is located axially by a first retaining surface 20 and a second retaining surface 22. The housing retaining member 18 and the pressure housing 4 define an annular recess 24 within which the seal housing 12 is situated. The housing retaining member 18 is retained by at least one retention feature 21, and has a sealed relationship with pressure housing 4 by virtue of seal element 19 and seal element 57.

The seal housing 12 incorporates a first dynamic seal 26 and a second dynamic seal 28. It is preferred that dynamic seals 26 and 28 be hydrodynamic seals such as those described above in connection with FIG. 1A. The dynamic seals 26 and 28 are preferably located and held in compressed relation with the relatively movable surface 16 by first and second seal grooves 30 and 32. Seal housing 12 defines extrusion gap 34 adjacent to dynamic seal 26, and extrusion gap 36 adjacent to dynamic seal 28.

In the example shown in FIG. 3, a third fluid 38 is provided that is isolated from the second fluid 10 by seals so that the pressure Po of the third fluid 38 can, if desired, be different than the pressure Pc of the second fluid 10. The third fluid 38 is provided for lubrication of dynamic seals 26 and 28 and the bearing arrangement of the seal housing 12.

The first fluid 6 is retained by dynamic seal 26 and by a sliding seal 42. The second fluid 10 is retained by seal element 19, dynamic seal 28, seal element 57, and a sliding seal 47. The third fluid 38 is retained by dynamic seals 26 and 28, seal element 19, and sliding seals 42 and 54. The sliding seal implementations are preferably face sealing arrangements (as shown), where a sealing element is located by a groove and compressed axially into sealing engagement with a mating surface. The grooves that mount the sliding seals can be cut into the seal housing, or into the mating surface of the pressure housing 4 and/or housing retaining member 18. For example, the grooves for sliding seals 47 and 54 are illustrated as being cut into the seal housing 12, but alternatively could have been cut into the housing retaining member 18. The sliding seals 42, 47, and 54 are preferably treated or coated to minimize breakout friction.

The third fluid 38 is maintained at pressure Po. It is preferred that the magnitude of pressure Po always be greater than the magnitude of pressure Pw, to prevent skew-induced wear of dynamic seal 26.

The pressure Pw of the first fluid 6 acts over the effective area 40 that is established by dynamic seal 26 and sliding seal 42, and imparts an axially acting hydraulic thrust on the seal housing 12, acting in direction U. The pressure Pc of the second fluid 10 acts over the effective area 45 that is established by dynamic seal 28 and sliding seal 47, and imparts an axially acting hydraulic thrust on seal housing 12, acting in direction D.

The pressure Po of the third fluid 38 acts over the effective area 51 that is established by sliding seals 42 and 54, and imparts an axially acting hydraulic thrust on the seal housing 12, acting in direction U. The pressure Po of the third fluid 38 also acts over the area 48 on both ends of the seal housing 12, and imparts equal and opposed axially acting hydraulic thrusts on the seal housing 12, which cancel each other.

A sealed balancing area 52 is defined by sliding seal 47 and sliding seal 54. A balancing fluid 56 at pressure Pb is communicated to balancing area 52, and exerts a hydraulic force on the seal housing 12 in direction D. For purpose of clarity with respect to FIG. 3, it is to be understood that the right end of the radial portion of the balancing fluid passageway in the housing retaining member 18 is plugged and the pressure Pb is only communicated to balancing area 52. The pressure Pb is preferably maintained at a value that is greater than or equal to pressure Po and greater than or equal to pressure Pc. The balancing fluid 56 is preferably distributed circumferentially around the second end 17 of the seal housing 12 by a distribution channel 58 formed into housing retaining member 18 and/or the seal housing 12.

It is preferred that the hydraulic forces acting in direction D from pressure Pc and pressure Pb be substantially equal, or at least roughly equal, to the hydraulic forces acting in direction U from pressure Pw and pressure Po. It is to be understood that the force acting in direction U from pressure Po is the net force in direction U from pressure Po. Because of this axial hydraulic force balance situation, the seal housing 12 is relatively free to slide laterally to accommodate lateral misalignment of the shaft 8.

Any suitable anti-rotation means can be used to keep the seal housing 12 from rotating with the shaft 8. For example, an anti-rotation projection 60 could project into a mating anti-rotation recess 62.

The pressure Pc of the second fluid 10 can be provided by any suitable Pc pressure supply 100, such as, but not limited to, a conventional computer-controlled pressure supply. The pressure Pc can be transmitted from the Pc pressure supply 100 by any suitable means, such as the pressure communication path 64 that is shown. Part of that path is illustrated as a cross-drilled hole 66.

Figure 3A:
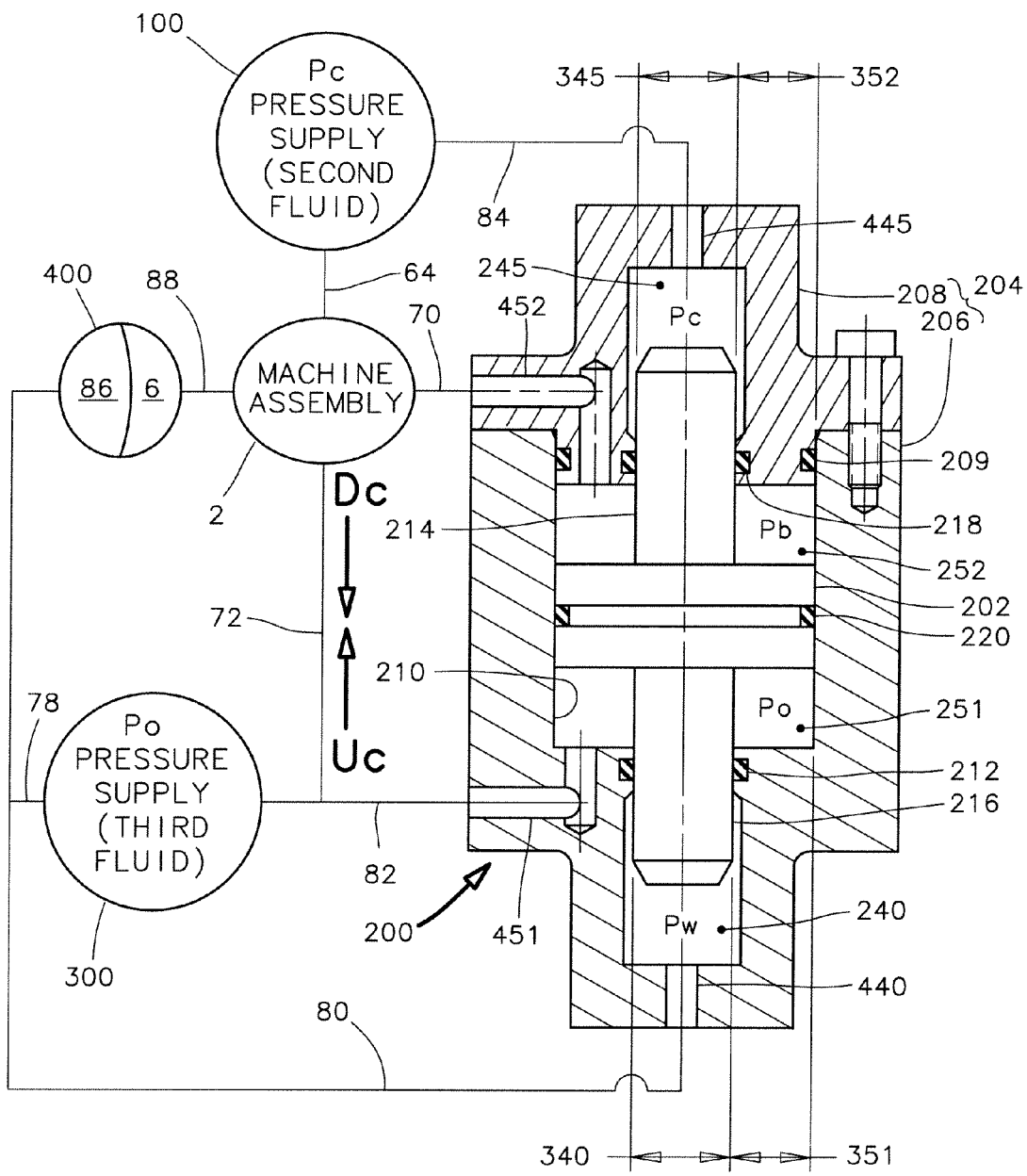
FIG. 3A is a cross-sectional view of a piston pressure supply for use with the pressure-balanced floating seal housing shown, for example, in FIG. 3.

The pressure Pb of the balancing fluid 56 can be provided by any suitable Pb pressure supply 200. One form of a suitable Pb pressure supply 200 would be a conventional computer-controlled pressure supply. Another example of a suitable Pb pressure supply 200 would be a differential area piston such as shown in FIG. 3A. The pressure Pb can be transmitted from the Pb pressure supply 200 by any suitable means, such as the pressure communication path 70. As illustrated in FIG. 3, the pressure communication path 70 can include a cross-drilled hole 68. One or more seal elements 57 may be used to seal in the pressure Pb at the juncture between the pressure housing 4 and the housing retaining member 18. In the example of FIG. 3, the seal element 57 is a local compression-type seal that surrounds the location of the cross-drilled hole so that fluid cannot escape at the juncture between the pressure housing 4 and the housing retaining member 18.

The pressure Po of the third fluid 38 can be provided by any suitable Po pressure supply 300. One form of a suitable Po pressure supply 300 would be a conventional computer-controlled pressure supply. Another example would be one of the differential area piston arrangements described in conjunction with the prior art. Pressure Po can be transmitted from the Po pressure supply 300 by any suitable means, such as the pressure communication path 72 that is shown. In FIG. 3, the pressure communication path 72 includes cross-drilled hole 74.

The pressure Po of the third fluid 38 can be transmitted to the interior of the seal housing 12 by any suitable means, such as the fluid path 76 that is illustrated as a radial drilled hole. In the embodiment of FIG. 3, the pressure Po of the third fluid 38 is communicated to the annular recess 24, exterior to the seal housing 12, by the cross-drilled hole 74, and is communicated from annular recess 24 to the region between dynamic seals 26 and 28 by the fluid path 76. The fluid path 76, while illustrated as a radial hole, can take other specific forms without departing from the spirit or scope of the invention.

To maintain the pressure Po of the third fluid 38 at its preferred value, it is preferred that the operation of the Po pressure supply 300 be controlled by the pressure Pw of the first fluid 6. If the Po pressure supply 300 is a computer-controlled pressurization system, the pressure Pw can be sensed with a pressure transducer that conveys the pressure information to the Po pressure supply 300 via an electrical path. If the Po pressure supply 300 is a hydraulically-controlled pressurization system, the pressure Pw is communicated through a pressure path. In FIG. 3, the electrical or hydraulic path is represented as control path 78. If the control path 78 is an electrical path, it is understood that it includes a pressure transducer. If the control path 78 is a hydraulic path, it is understood that it takes the form of a fluid conduit.

To maintain pressure Pb of the balancing fluid 56 at its preferred value, it is preferred that the operation of the Pb pressure supply 200 be partly controlled by pressure Pw. If the Pb pressure supply 200 is a computer-controlled pressurization system, the pressure Pw can be sensed with a pressure transducer that conveys the pressure information to the Pb pressure supply 200 via an electrical path. If the Pb pressure supply 200 is a hydraulically-controlled pressurization system, the pressure Pw is communicated to the Pb pressure supply 200 through a pressure path. In FIG. 3, the electrical or hydraulic path is represented as control path 80. If the control path 80 is an electrical path, it is understood that it includes a pressure transducer. If the control path 80 is a hydraulic path, it is understood that it takes the form of a fluid conduit.

To maintain pressure Pb of the balancing fluid 56 at its preferred value, it is preferred that the operation of the Pb pressure supply 200 be partly controlled by pressure Po of the third fluid 38. If the Pb pressure supply 200 is a computer-controlled pressurization system, the pressure Po can be sensed with a pressure transducer that conveys the pressure information to the Pb pressure supply 200 via an electrical path. If the Pb pressure supply 200 is a hydraulically-controlled pressurization system, the pressure Po is communicated to the Pb pressure supply 200 through a pressure path. In FIG. 3, the electrical or hydraulic path is represented as control path 82. If the control path 82 is an electrical path, it is understood that it includes a pressure transducer. If the control path 82 is a hydraulic path, it is understood that it takes the form of a fluid conduit.

To maintain pressure Pb at its preferred value, it is preferred that the operation of the Pb pressure supply 200 be partly controlled by pressure Pc. If the Pb pressure supply 200 is a computer-controlled pressurization system, the pressure Pc can be sensed with a pressure transducer that conveys the pressure information to the pressure supply via an electrical path. If the Pb pressure supply 200 is a hydraulically-controlled pressurization system, the pressure Pc is communicated to the Pb pressure supply 200 through a pressure path. In FIG. 3, the electrical or hydraulic path is represented as control path 84. If the control path 84 is an electrical path, it is understood that it includes a pressure transducer. If the control path 84 is a hydraulic path, it is understood that it takes the form of a fluid conduit.

If the first fluid 6 is drilling fluid or other difficult fluid, it is preferable to protect the pressure transducer(s) or hydraulic path(s) of control path 78 and control path 80 from the drilling fluid using a fluid separator 400 that separates the first fluid 6 from a clean fluid 86 while imparting pressure Pw to the clean fluid 86. The fluid separator 400 can take any suitable form including a piston-type separator, but the preferred form uses a bladder or diaphragm. The fluid separator 400 is exposed to the first fluid 6 through a pressure communication path 88 of any suitable form. The length of the pressure communication path 88 is preferably as short as possible, and preferably would be integrated directly into the pressure housing 4.

In the machine assembly 2 of FIG. 3, the hydraulic pressures that produce axially acting force on the seal housing 12 act over certain areas. The axially acting hydraulic forces are equal to pressure times area. Pressure Pw acts on the seal housing 12 on the effective area 40 producing a force (Pw) in direction U. Pressure Pc acts on the seal housing 12 over the effective area 45 producing a force (Pc) in direction D.

Pressure Po acts on the seal housing 12 over effective area 51 in direction U, and acts on the seal housing 12 over area 48 in direction D and direction U. Since pressure Po acts on both ends of the seal housing, when calculating pressure Po-related hydraulic force, area 48 can be ignored. In other words, the net axially acting force (Po) (acting in direction U) from pressure Po equals pressure Po times effective area 51.

Pressure Pb acts over balancing area 52 and produces an axially acting force (Pb) on the seal housing 12 that is equal to pressure Pb times balancing area 52. This force acts in direction D.

To make it easy for the seal housing 12 to move laterally to follow the radial motion of the shaft 8, the hydraulic forces acting in directions U and D should be substantially equal unless it is desired to balance out other axially acting forces. Whether one is only balancing the hydraulic forces, or also balancing other forces, the balancing can be accomplished by controlling the magnitude of the balancing pressure Pb.

Description of FIG. 3A

FIG. 3A illustrates a preferred Pb pressure supply 200 for producing the correct magnitude of pressure Pb for the seal housing arrangement of FIG. 3. It is a hydraulic cylinder arrangement, wherein a stepped piston 202 has a sealed relationship with a pressure housing assembly 204 that comprises a hydraulic cylinder 206 and at least one removable end 208. The hydraulic cylinder 206 and the removable end 208 have a sealed relationship with each other by virtue of closure seal 209. The pressure housing assembly 204 can take any suitable configuration that permits each assembly. For example, each end of the hydraulic cylinder could be removable.

The stepped piston 202 has a sealed relationship with a bore 210 of the pressure housing assembly 204 by virtue of third reciprocating seal 220. The stepped piston 202 has a first piston rod 216 and a second piston rod 214. The stepped piston 202 has a sealed relationship with respect to the pressure housing assembly 204 by virtue of first reciprocating seal 212 and second reciprocating seal 218. Thus, the Pb pressure supply 200 establishes pressure chambers 240, 245, 251, and 252 defining, respectively, hydraulic areas 340, 345, 351, and 352. Hydraulic area 351 is the area between bore 210 and first piston rod 216. Hydraulic area 352 is the area between bore 210 and second piston rod 214.

Pressure communication is established through the structure of the pressure housing assembly 204 to the pressure chambers 240, 245, 251, and 252 by passages 440, 445, 451, and 452, respectively. Pressure Pc is conducted from the Pc pressure supply 100 to pressure chamber 245 by control path 84 (which includes passage 445) and is conducted to the machine assembly by pressure communication path 64. Pressure Po is conducted from the Po pressure supply 300 to the pressure chamber 251 by control path 82 (which includes passage 451) and is conducted to the machine assembly 2 by pressure communication path 72. Pressure Pw is conducted from the machine assembly 2 to the pressure chamber 240 by a pressure path that may include control path 80, pressure communication path 88, fluid separator 400, and passage 440. The fluid separator 400 is schematically illustrated, identifying first fluid 6 and clean fluid 86. Control path 78 is illustrated for the sake of completeness.

Pressure Pw, pressure Pc, and pressure Po impart axially acting force to the stepped piston 202. These forces produce the desired pressure Pb within the pressure chamber 252. Pressure Pb is conducted from pressure chamber 252 to machine assembly 2 by pressure communication path 70 (which includes passage 452).

If the hydraulic area 340, hydraulic area 345, hydraulic area 351, and hydraulic area 352 of the Pb pressure supply 200 of FIG. 3A have the same ratios to each other as the effective areas for the same pressures have in the assembly of FIG. 3, the pressure Pb that is generated by Pb pressure supply 200 will be substantially correct to balance the axially acting hydraulic forces on the seal housing 12 of FIG. 3. In other words, hydraulic area 340, hydraulic area 345, hydraulic area 351, and hydraulic area 352 of the Pb pressure supply 200 of FIG. 3A have the same size proportions to each other as the effective area 40, effective area 45, effective area 51, and balancing area 52 of the machine assembly of FIG. 3.

If Newtonian fluids are used, the only deviation from generating the theoretically perfect pressure Pb will be due to friction of the first reciprocating seal 212, second reciprocating seal 218, and third reciprocating seal 220 of FIG. 3A. If desired, the areas in the Pb pressure supply 200 of FIG. 3A can be modified slightly to also balance out other forces acting on seal housing 12, such as the weight of the seal housing 12 and face sealing compressive force. Such a fine degree of balancing is not normally necessary, however, because the dominant axially acting forces on the seal housing 12 of FIG. 3 are typically the hydraulic forces. To minimize the friction of the first reciprocating seal 212, second reciprocating seal 218, and third reciprocating seal 220, they can be treated or coated with a friction reducing substance.

Figure 4:
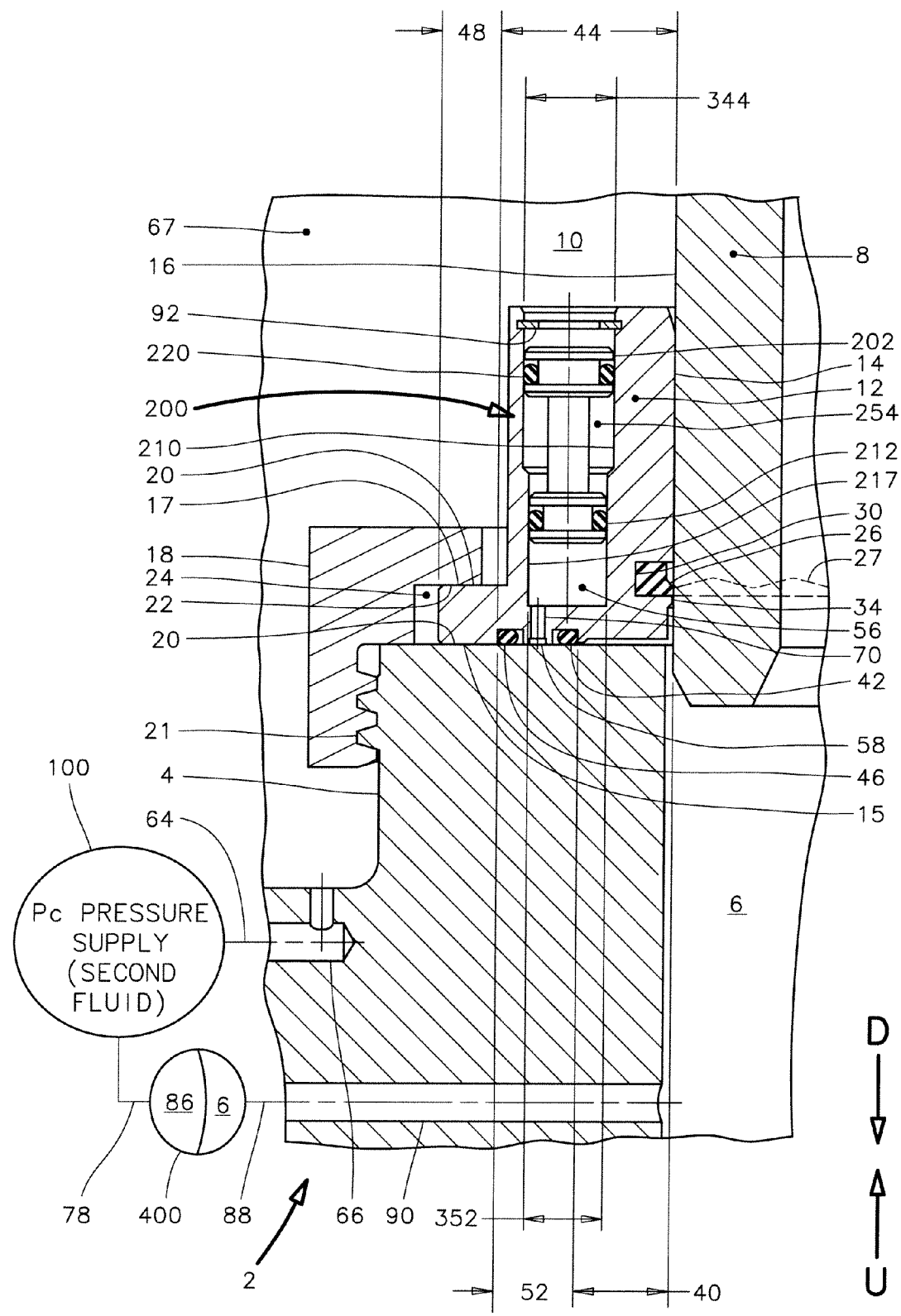
FIG. 4 is a cross-sectional view of yet another embodiment of the pressure-balanced floating seal housing of the present invention, including a stepped piston pressure supply that is mounted within the seal housing.

Description of FIG. 4

FIG. 4 shows a fragmentary view of a machine assembly generally at 2 that includes a pressure housing 4 that contains or is exposed to a first fluid 6 at pressure Pw. A portion of a shaft 8 is located within the pressure housing 4 and is capable of rotation relative to the pressure housing 4. The pressure housing 4 contains or is exposed to a second fluid 10 at pressure Pc.

At least one seal housing 12 is provided that has a radial bearing-type relationship with the shaft 8. In FIG. 4, the bearing type relationship is achieved by a journal bearing bore 14, which has a guiding fit with a relatively movable surface 16 of the shaft 8.

A housing retaining member 18 of any suitable configuration is provided. The seal housing 12 is located axially by a first retaining surface 20 and a second retaining surface 22. The housing retaining member 18 and the pressure housing 4 define an annular recess 24 within which part of the seal housing 12 is situated. The housing retaining member 18 is retained to the pressure housing 4 by one or more retention features 21, such as the threads that are shown.

The seal housing 12 incorporates a dynamic seal 26 which is preferably a hydrodynamic seal and is located and held in compressed relation with the relatively movable surface 16 by a seal groove 30. Adjacent to the dynamic seal 26, seal housing 12 defines an extrusion gap 34.

The first fluid 6 is contained by the first dynamic seal 26 and by a sliding seal 42. The second fluid 10 is retained by the first dynamic seal 26 and by a sliding seal 46. The pressure Pc of the second fluid 10 is maintained at a value that is a percentage greater than the pressure Pw of the first fluid 6. For this example, pressure Pc is assumed to be 1.5 times greater than pressure Pw.

The pressure Pw of the first fluid 6 acts over the effective area 40 that is established by dynamic seal 26 and sliding seal 42, and imparts an axially acting hydraulic thrust on the seal housing 12, acting in direction U. The pressure Pc of the second fluid 10 acts over the effective area 44 that is established by dynamic seal 26 and sliding seal 46, and imparts an axially acting hydraulic thrust on the seal housing 12, acting in direction D. The pressure Pc of the second fluid 10 also acts over the area 48 and imparts equal and opposed axially acting hydraulic thrusts on the seal housing 12.

A sealed balancing area 52 is defined by sliding seal 42 and sliding seal 46. A balancing fluid 56 at pressure Pb is communicated to the sealed balancing area 52, and exerts a hydraulic force on the seal housing 12 in direction U. The pressure Pb is preferably maintained at a magnitude that is greater than or equal to the magnitude of pressure Pc and pressure Pw.

It is preferred that the hydraulic forces acting in direction D from pressure Pc can be substantially equal, or at least roughly equal, to the hydraulic forces acting in direction U from pressure Pw and pressure Pb. Because of this axial hydraulic force balance situation, the seal housing 12 is relatively free to slide laterally to accommodate lateral misalignment of the shaft 8. In addition to the above-described axial force balance condition, the seal housing 12 is substantially pressure-balanced in the radial direction. Any suitable anti-rotation means (not shown) can be used to keep the seal housing 12 from rotating with the shaft 8.

The pressure Pc of the second fluid 10 can be provided by any suitable Pc pressure supply 100, such as, but not limited to, the differential area piston arrangement that is described herein in conjunction with the prior art.

The pressure Pc can be transmitted from the Pc pressure supply 100 by any suitable means, such as the pressure communication path 64. In FIG. 4, the pressure communication path 64 is illustrated as including a cross-drilled hole 66. The pressure enters fluid cavity 67, and reaches the dynamic seal 26 by any suitable means, such as the clearance between the shaft 8 and the seal housing 12.

To maintain the pressure Pc of the second fluid 10 at its preferred value, it is preferred that the operation of the Pc pressure supply 100 be controlled in relation to the pressure Pw of the first fluid 6. If the Pc pressure supply 100 is a computer-controlled pressurization system, the pressure Pw can be sensed with a pressure transducer that conveys the pressure information to the pressure supply via an electrical path. If the Pc pressure supply 100 is a hydraulically-controlled pressurization system, the pressure Pw is conveyed to the Pc pressure supply 100 hydraulically via a fluid path. In FIG. 4, the electrical or hydraulic path is represented as control path 78. If the control path 78 is an electrical path, it is understood that it includes a pressure transducer. If the control path 78 is a hydraulic path, it is understood that it takes the form of a fluid conduit.

It is preferable to protect the pressure transducer or hydraulic path from the first fluid 6 using a fluid separator 400 that separates the first fluid 6 from a clean fluid 86 while imparting pressure Pw to the clean fluid 86. The fluid separator 400 can take any suitable form including a piston-type separator, but the preferred form uses a bladder or diaphragm because it has less hysteresis. The fluid separator 400 is exposed to the first fluid 6 through a pressure communication path 88 of any suitable form. In FIG. 4, part of the pressure communication path 88 is illustrated as a drilled hole 90.

The pressure Pb of the balancing fluid 56 can be provided by a Pb pressure supply 200 that is a differential area piston arrangement mounted within the seal housing 12. The pressure Pb of the balancing fluid 56 is transmitted from the Pb pressure supply 200 via the pressure communication path 70. The Pb pressure supply 200 of FIG. 4 is preferably incorporated within the seal housing 12.

Because the pressure of the second fluid 10 is a fixed ratio to the pressure Pw of the first fluid 6, it is not necessary to communicate the pressure Pw of the first fluid 6 to the Pb pressure supply 200.

In the machine assembly 2 of FIG. 4, the hydraulic pressures that produce axially acting force on the seal housing 12 act over certain areas, as described above. The axially acting hydraulic forces are equal to pressure times area. Pressure Pw acts on the seal housing 12 on the effective area 40 producing a force in direction U that is equal to pressure Pw times effective area 40. Pressure Pc acts on the seal housing 12 over the effective area 44 and produces a force in direction D. Pressure Pb acts on the seal housing 12 on the balancing area 52 producing a force in direction U that is equal to pressure Pb times balancing area 52.

To facilitate laterally sliding movement of the seal housing 12 in response to the radial motion of the shaft 8, the aforementioned forces acting in direction U and direction D should be substantially equal. In FIG. 4, the aforementioned forces acting in direction U and direction D are substantially equal due to the proportions of the sealed areas of the Pb pressure supply 200 relative to the sealed areas of the seal housing 12.

A stepped piston 202 establishes hydraulic area 352 by virtue of a first reciprocating seal 212 that establishes sealing between the stepped piston 202 and the surrounding structure. In FIG. 4, the first reciprocating seal 212 is shown as a piston-type seal having a sealed relationship with a mating bore 217. The stepped piston 202 establishes a second hydraulic area 344 by virtue of a reciprocating seal 220, here shown as a piston-type seal having a sealed relationship with a mating bore 210. The region 254 is preferably a vacuum, but can be filled, or partially filled, with a gas.

Pressure Pc imparts axially acting force to the stepped piston 202 that produces the desired pressure Pb. Pressure Pb is conducted from Pb pressure supply 200 to balancing area 52 the via the pressure communication path 70.

The hydraulic area 344 and hydraulic area 352 of the Pb pressure supply 200 have certain proportions with respect to each other. The effective area 44 and balancing area 52 of the seal housing 12 also have certain proportions with respect to each other. The area proportions of the pressure supply 200 are configured so that the pressure Pb that is generated by the Pb pressure supply 200 will be substantially correct to balance the axially acting hydraulic forces on the seal housing 12. An internal shoulder 92 is provided to limit piston movement, and is illustrated as a retaining ring.

The Pb pressure supply 200 of FIG. 4 works without communicating pressure Pw of the first fluid 6 to the stepped piston 202 because the pressure Pc of the second fluid 10 is a known ratio to the pressure Pw of the first fluid 6. The pressure Pb of the balancing fluid 56 acts on balancing area 52 and the pressure Pw of the first fluid 6 acts on effective area 40 to produce respective hydraulic forces acting in direction U. The pressure Pc of the second fluid 10 acts on effective area 44 to produce a hydraulic force acting in direction D. The pressure Pb of the balancing fluid 56 has a magnitude such that the forces acting in directions U and D are substantially equal, and cancel each other out.

In this particular arrangement, because the pressure Pc is known relative to Pw, there is no need to communicate pressure Pw to any area of the piston. Were it necessary, a small local face sealing O-ring could be used to communicate that pressure to the correct location on a correctly sized piston. In FIG. 4, ideally the region 254 would be at or near a vacuum, but in some cases that won't be necessary because the value of pressure Pc is so high that the pressure generated by compressing air in region 254 would be negligible. The vacuum could be accomplished by having a port or small valve to close the region off after region 254 was evacuated (or partially evacuated). Alternately, the piston could be installed as deep as it can go before a plug is installed that seals off region 254. Such a plug and related passage could be included in the stepped piston 202 if desired.

Figure 5:
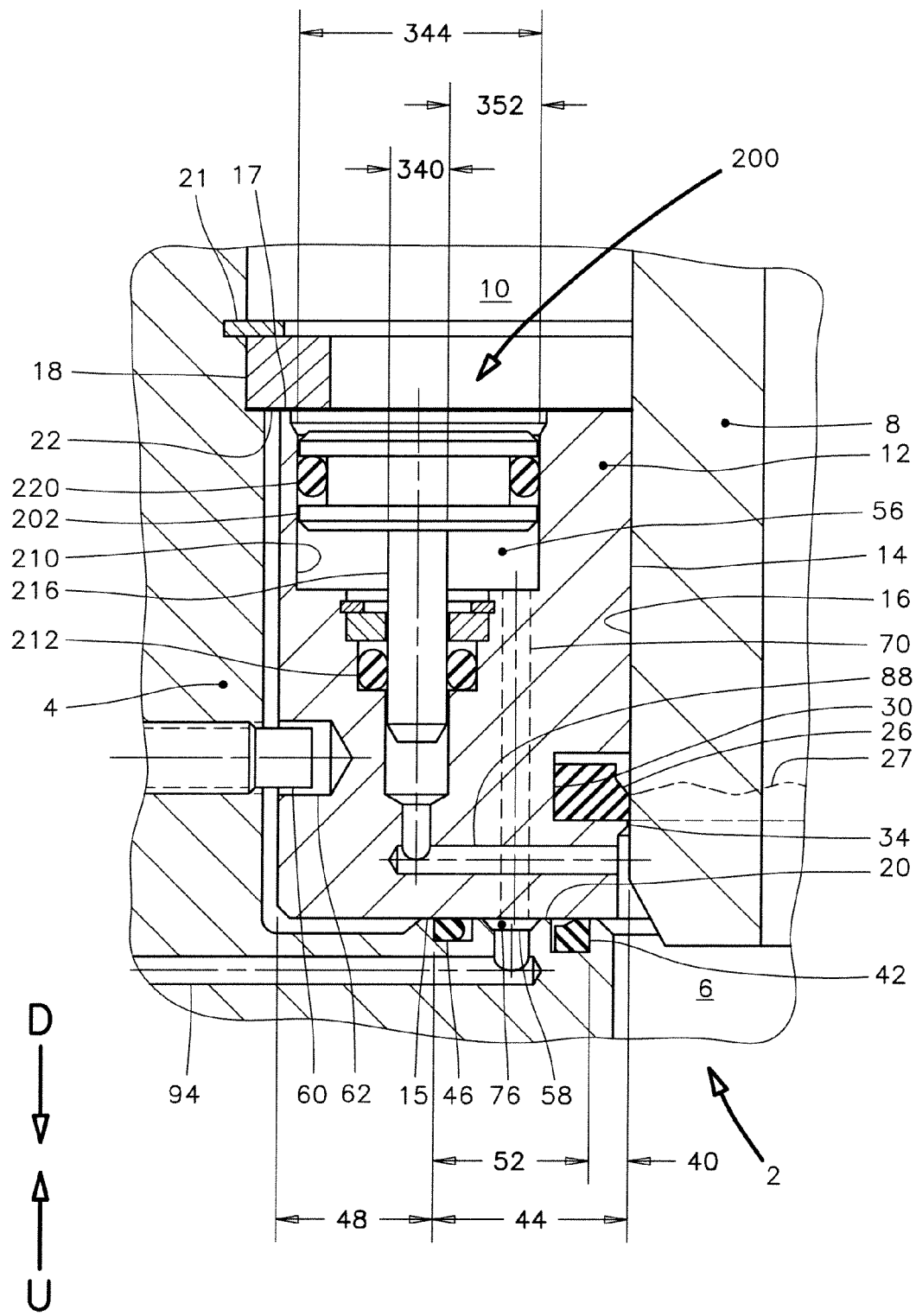
FIG. 5 is a cross-sectional view of an alternative embodiment of the pressure-balanced floating seal housing of the present invention, having a stepped piston pressure supply within the seal housing, similar to FIG. 4, but configured for applications where one fluid is a clean fluid, such as the atmosphere.

Description of FIG. 5

FIG. 5 shows a fragmentary view of a machine assembly generally at 2 that includes a pressure housing 4 that contains or is exposed to a first fluid 6 at pressure Pw. The arrangement of FIG. 5 is very similar to that of FIG. 1A, except that the Pb pressure supply 200 is mounted in the seal housing 12. The arrangement of FIG. 5 is particularly suitable for applications where the first fluid 6 is a relatively clean fluid, such as the atmosphere.

At least a portion of a shaft 8 is located within, and relatively rotatable to, the pressure housing 4. The pressure housing 4 contains or is exposed to a second fluid 10 at pressure Pc. The arrangement of FIG. 5 is applicable where the pressure Pc of the second fluid 10 is greater than or equal to the pressure Pw of the first fluid 6.

The seal housing 12 has a first housing end 15 and a second housing end 17, and has a radial bearing-type relationship with the shaft 8. In FIG. 5, a journal bearing bore 14 has a close, journal bearing-type guiding fit with the shaft 8. Because of the radial bearing relationship and the axial hydraulic force balancing described below, the seal housing 12 is capable of being positioned laterally by the shaft 8.

A housing retaining member 18 captures the seal housing 12. More specifically, the seal housing 12 is located axially by a first retaining surface 20 and a second retaining surface 22. The housing retaining member 18 is retained to the pressure housing 4 by one or more retention features 21, such as the retaining ring that is illustrated.

The seal housing 12 incorporates a dynamic seal 26 that is preferably a hydrodynamic seal that establishes a sealing footprint against the relatively movable surface 16 that has a wavy footprint edge 27 that faces the second fluid 10. The dynamic seal 26 is preferably located and held in compressed relation with the relatively movable surface 16 by a seal groove 30. On the side of the dynamic seal 26 that is exposed to the first fluid 6, the seal housing 12 defines a clearance fit with the relatively movable surface 16, identified as extrusion gap 34.

The first fluid 6 is contained by the first dynamic seal 26 and sliding seal 42. The second fluid 10 is retained by the first dynamic seal 26 and sliding seal 46.

The pressure Pw of the first fluid 6 acts over the effective area 40 that is established by dynamic seal 26 and sliding seal 42, and imparts an axially acting hydraulic thrust on the seal housing 12, acting in direction U. The pressure Pc of the second fluid 10 acts over the effective area 44 that is established by dynamic seal 26 and sliding seal 46, and imparts an axially acting hydraulic thrust on the seal housing 12, acting in direction D. The pressure Pc of the second fluid 10 also acts over the area 48 on both ends of the seal housing, and imparts equal and opposed axially acting hydraulic thrusts on the seal housing 12.

A sealed balancing area 52 is defined by sliding seal 42 and sliding seal 46. A balancing fluid 56 at pressure Pb is communicated to the sealed balancing area 52, and exerts a hydraulic force on the seal housing 12 in direction U. The pressure Pb is preferably maintained at a magnitude that is greater than or equal to the magnitude of pressure Pc and pressure Pw. The balancing fluid 56 is preferably distributed circumferentially around the end of the seal housing 12 by a distribution channel 58.

It is preferred that the hydraulic forces acting in direction D from pressure Pc are substantially equal to the hydraulic forces acting in direction U from pressure Pw and pressure Pb. Because of this axial hydraulic force balance situation, the seal housing 12 is relatively free to slide laterally to accommodate lateral misalignment of the shaft 8. In addition to the above-described axial force balance condition, the seal housing 12 is pressure-balanced in the radial direction along most of its length, making it relatively immune from pressure breathing; i.e. differential pressure-induced expansion. An anti-rotation projection 60 projects into a mating anti-rotation recess 62 to prevent the seal housing 12 from rotating with the shaft 8.

In FIG. 5, the Pb pressure supply 200 is a differential area piston arrangement. The pressure Pb is transmitted from the Pb pressure supply 200 by the pressure communication path 70. To maintain pressure Pb at its preferred value, the operation of the Pb pressure supply 200 is controlled by pressure Pc of the second fluid 10 and by pressure Pw of the first fluid 6. Pressure Pw acts on the seal housing 12 on the effective area 40 producing a force in direction U that is equal to pressure Pw times effective area 40. Pressure Pc acts on the seal housing 12 over the effective area 44 and produces a force in direction D. Pressure Pb acts on the seal housing 12 on the balancing area 52 producing a force in direction U that is equal to pressure Pb times balancing area 52.

To facilitate laterally sliding movement of the seal housing 12 in response to the radial motion of the shaft 8, the aforementioned forces acting in direction U and direction D should be substantially equal. In FIG. 5, the aforementioned forces acting in direction U and direction D are substantially equal due to the proportions of the sealed areas of the Pb pressure supply 200 relative to the sealed areas of the seal housing 12.

In the Pb pressure supply 200 of FIG. 5, a stepped piston 202 establishes a first hydraulic area 340 by virtue of a first reciprocating seal 212 that establishes sealing between the stepped piston 202 and the surrounding structure of the seal housing 12. The stepped piston 202 establishes a second hydraulic area 344 by virtue of a third reciprocating seal 220, here shown as a piston-type seal having a sealed relationship with a mating bore 210. The hydraulic area 352 is the difference between the second hydraulic area 344 and the first hydraulic area 340. In FIG. 5, hydraulic area 352 is the transverse area between bore 210 and piston rod 216. The pressure Pw of the first fluid 6 is transmitted to the Pb pressure supply 200 by pressure communication path 88.

Pressure Pw and pressure Pc impart axially acting force to the stepped piston 202 that produces the desired pressure Pb. Pressure Pb is conducted from the Pb pressure supply 200 to balancing area 52 via the pressure communication path 70.

The hydraulic area 340, hydraulic area 344, and hydraulic area 352 of the Pb pressure supply 200 have certain proportions with respect to each other. The effective area 40, effective area 44, and balancing area 52 of the seal housing 12 also have certain proportions with respect to each other. If the area proportions of the Pb pressure supply 200 are substantially the same as the area proportions of the seal housing 12, the pressure Pb that is generated by the Pb pressure supply 200 will be substantially correct to balance the axially acting hydraulic forces on the seal housing 12. A fill port 94 is provided to facilitate filling of the balancing fluid 56.

Figure 6:
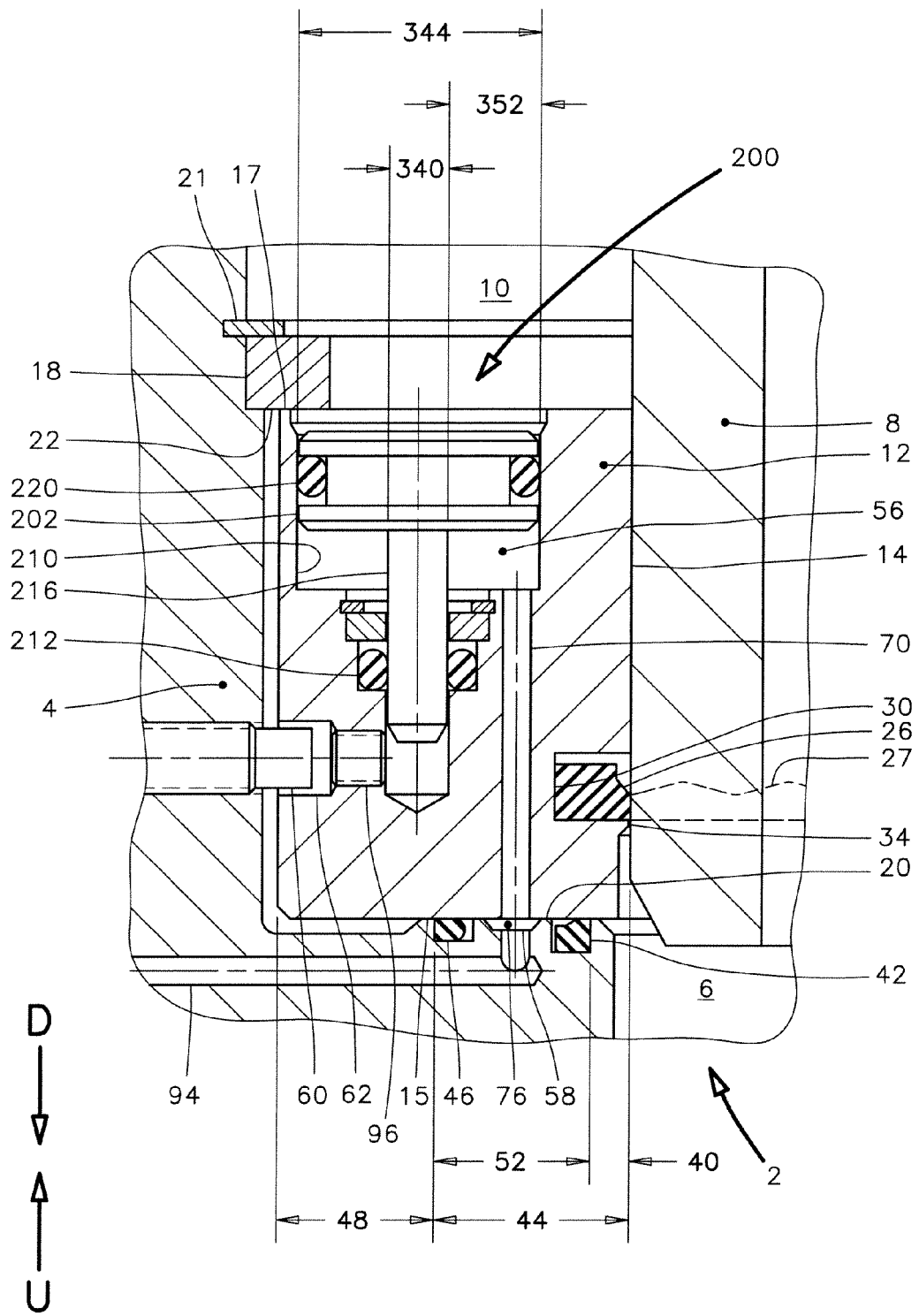
FIG. 6 is a cross-sectional view of an embodiment of the pressure-balanced floating seal housing similar to that shown in FIG. 5, where the fluid conduit between the piston and the first fluid is replaced by a vacuum.

Description of FIG. 6

FIG. 6 shows a fragmentary view of a machine assembly generally at 2 that is nearly identical to that shown in FIG. 5. The only difference is that the pressure communication path 88 of FIG. 5 has been eliminated, and an evacuation port 96 has been added. The FIG. 6 arrangement can be used when the pressure Pw of the first fluid 6 is low, such as at atmospheric pressure, or a vacuum. A semi-vacuum is created in the region that establishes first hydraulic area 340 by inserting the stepped piston 202, then plugging the evacuation port 96, and then filling the balancing fluid 56 via the fill port 94 to move the stepped piston to the initial filled position that is shown. The axial motion of the stepped piston 202 that results from the act of filling the balancing fluid draws a partial vacuum on first hydraulic area 340. If the pressure Pw of the first fluid 6 is low, such as atmospheric or a vacuum, a partial vacuum on the first hydraulic area 340 is close enough to the pressure Pw to effect substantial axial hydraulic force balance on the seal housing 12. If desired, before the time the evacuation port 96 is plugged, the piston position can be adjusted to leave more or less air within the cavity that the piston rod 216 extends into.

Figure 7:
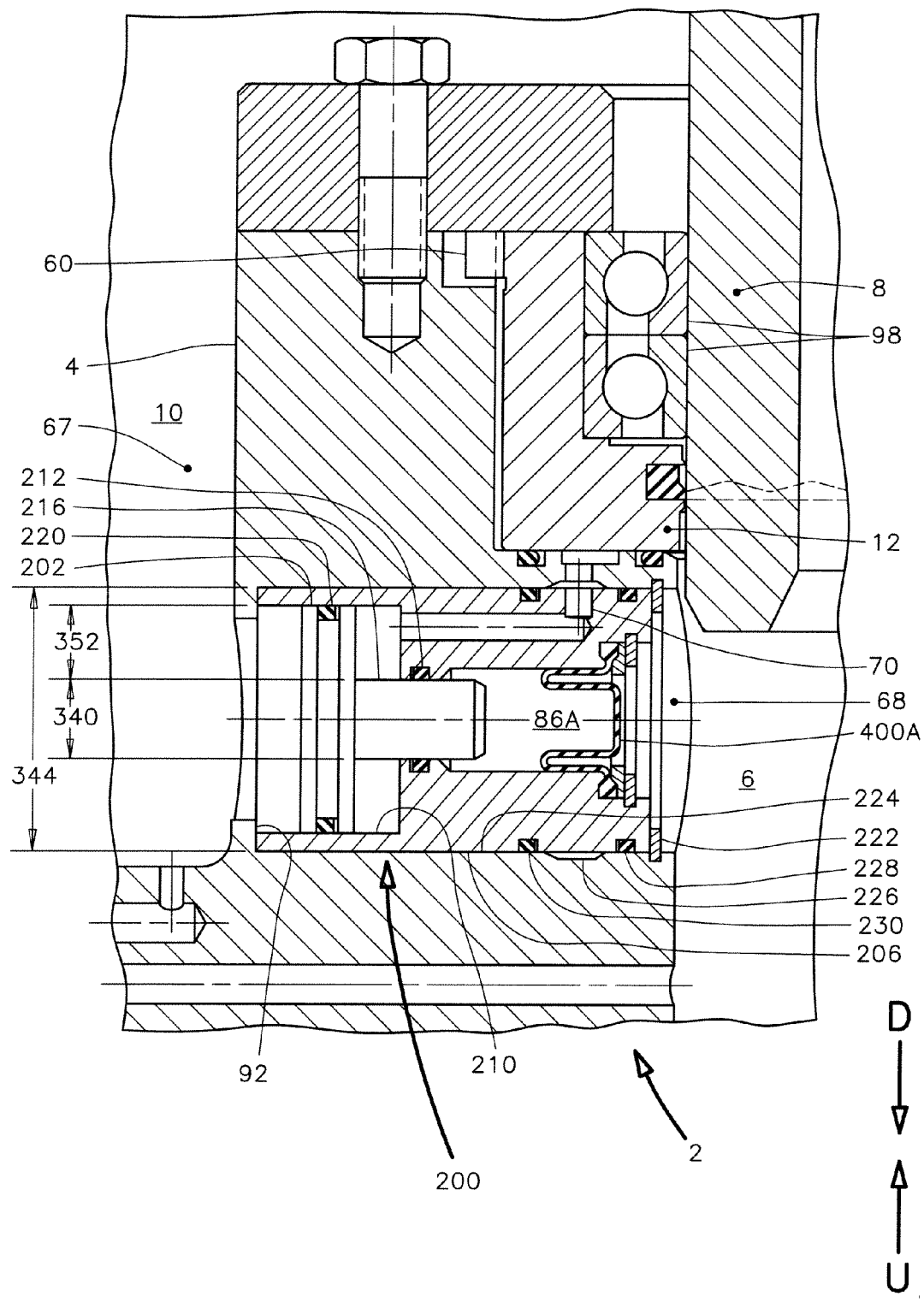
FIG. 7 is a cross-sectional view of an embodiment of the pressure-balanced floating seal housing similar to that shown in FIG. 2 and including rolling element bearings between the seal housing and the shaft of a blowout preventer.

Description of FIG. 7

FIG. 7 shows a fragmentary view of a machine assembly generally at 2 that is nearly identical to that shown in FIG. 2. The only difference is that the bearing relationship between the seal housing 12 and the shaft 8 is established by at least one rolling element bearing 98. In FIG. 7, the at least one rolling element bearing 98 is illustrated as a pair of angular contact ball bearings.

Figure 8:
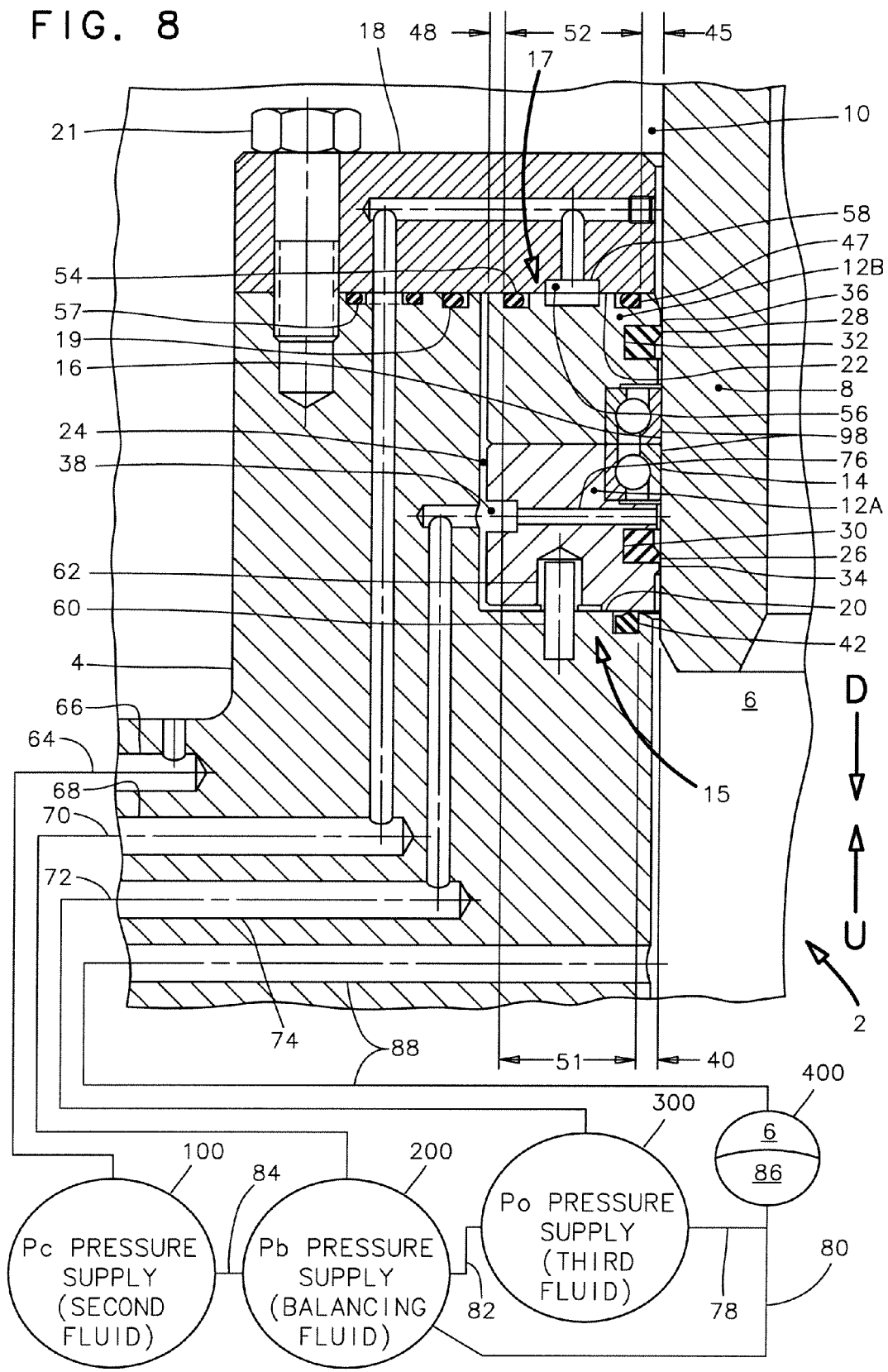
FIG. 8 is a cross-sectional view of an alternative embodiment of the pressure-balanced floating seal housing of the present invention similar to that shown in FIG. 3 and including rolling element bearings between the seal housing and the shaft of a blowout preventer.

Description of FIG. 8

FIG. 8 shows a fragmentary view of a machine assembly generally at 2 that is nearly identical to that shown in FIG. 3.

The only difference is that the seal housing or carrier has been split into two separate seal carriers, (seal carrier 12A and seal carrier 12B), each including at least one rolling element bearing 98. The rolling element bearings locate seal carrier 12A and seal carrier 12B with respect to the shaft 8.

Figure 9:
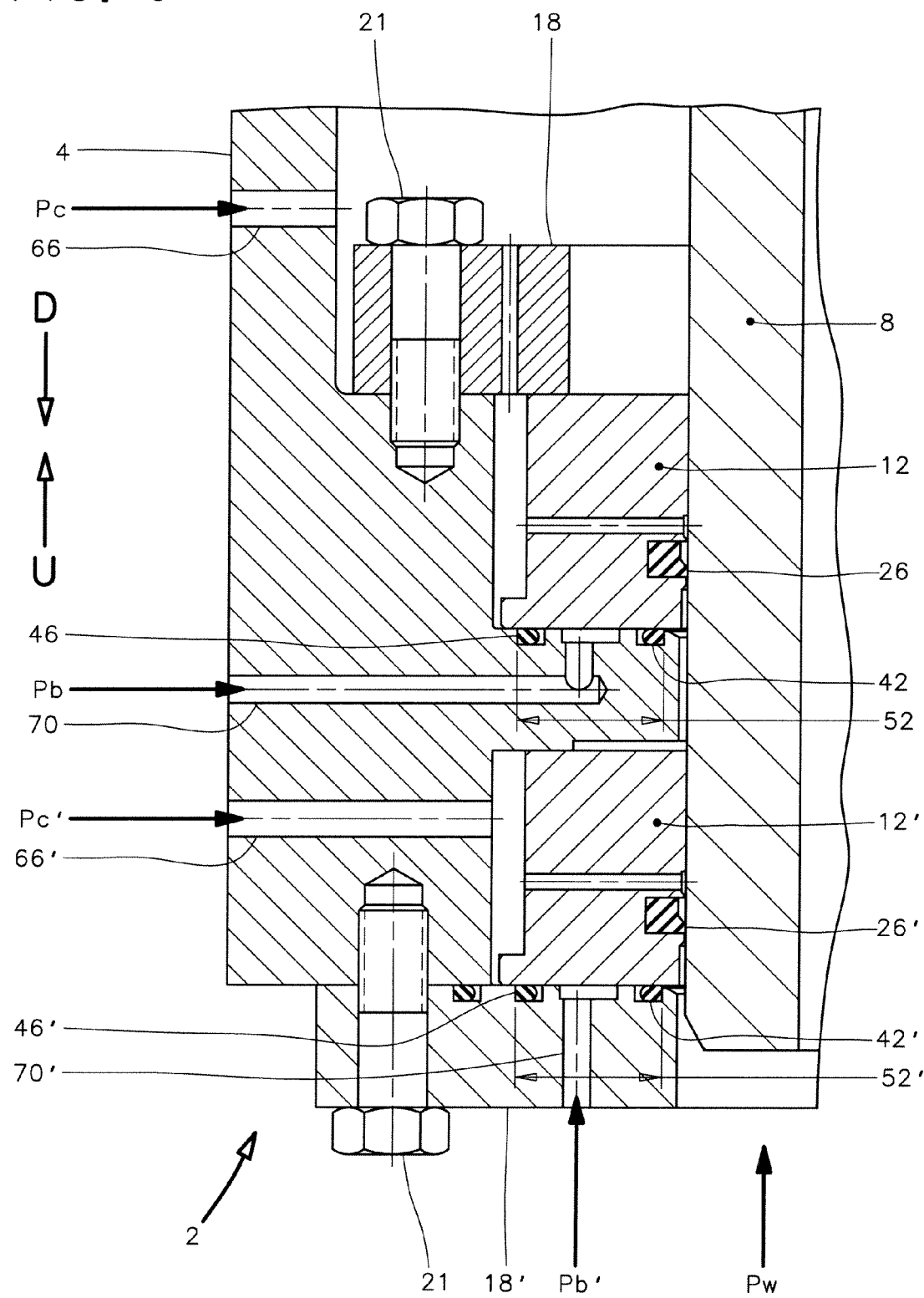
FIG. 9 is a cross-sectional view of another embodiment of the present invention having two separate pressure-balanced seal housings in a pressure staged arrangement.

Description of FIG. 9

FIG. 9 shows a fragmentary view of a machine assembly generally at 2 that includes a pressure housing 4 that is exposed to a first fluid at pressure Pw.

At least a portion of a shaft 8 is located within the pressure housing 4, and is relatively rotatable with respect to the pressure housing 4. The pressure housing 4 contains a second fluid at pressure Pc. The arrangement of FIG. 9 is applicable where the pressure Pc of the second fluid is greater than or equal to the pressure Pw of the first fluid. For example, the machine assembly 2 could be a rotary blowout preventer, the first fluid at pressure Pw could be the atmosphere, and the second fluid at pressure Pc could be a pressurized lubricant.

A first seal housing 12 and a second seal housing 12' are provided that each have a radial bearing-type relationship with the shaft 8, and are positioned laterally by the shaft 8.

The first seal housing 12 and second seal housing 12' are captured axially by housing retaining member 18 and housing retaining member 18', respectively. The housing retaining member 18 and housing retaining member 18' are each retained by one or more retention feature 21, such as the threaded fasteners that are illustrated.

The first seal housing 12 and second seal housing 12' mount first dynamic seal 26 and second dynamic seal 26', respectively. The first seal housing 12 has a sealed relationship with sliding seal 42 and sliding seal 46, such that the sliding seals establish balancing area 52. The second seal housing 12' has a sealed relationship with sliding seal 42' and sliding seal 46', such that the sliding seals establish balancing area 52'.

A third fluid is introduced into the region between rotary seal 26 and 26' at a pressure Pc' that is less than pressure Pc. For example, if Pc' is equal to Pc divided by two, then the pressure differential acting across rotary seals 26 and 26' is one half of the value of pressure Pc. A balancing pressure Pb is introduced to balancing area 52, which creates a hydraulic force acting on seal carrier 12 acting in direction U. A balancing pressure Pb' is introduced to balancing area 52', which creates a hydraulic force acting on seal carrier 12' acting in direction U.

It is preferred that the hydraulic forces acting on seal housing 12 in direction D are substantially equal to the hydraulic forces acting in direction U, so that the seal housing 12 is relatively free to slide laterally to accommodate lateral misalignment of the shaft 8. Likewise, it is preferred that the hydraulic forces acting on seal housing 12' in direction D are substantially equal to the hydraulic forces acting in direction U, so that the seal housing 12' is relatively free to slide laterally. The balancing pressures can be generated with a simple piston arrangement, or any suitable means, including computer control of pressure. It is possible to size the various hydraulic areas and pressures so that balancing pressure Pb and balancing pressure Pb' are equal.

The foregoing disclosure and description of the invention are illustrative and explanatory thereof, and various changes in the size, shape, and materials, as well as in the details of the illustrated construction shown and described, may be made without departing from the spirit of the invention. The present embodiments are, therefore, to be considered as merely illustrative and not restrictive, the scope of the invention being indicated by the claims rather than the foregoing description, and all changes which come within the meaning and range of equivalence of the claims are therefore intended to be embraced therein.

I claim:

1. A dynamic sealing mechanism for a machine assembly, comprising:
   a pressure housing;
   a retaining member;
   an annular seal housing having opposed first and second ends and a generally axially oriented throughbore extending from the first end to the second end, the retaining member capturing the seal housing axially relative to the pressure housing while allowing the seal housing to move laterally relative to the pressure housing;
   a shaft having an external sealing surface of generally cylindrical form having a shaft sealing surface diameter, the sealing surface of the shaft being movable relative to the seal housing, and the sealing surface of the shaft extending completely through the seal housing and locating the seal housing laterally;
   a dynamic seal contacting and establishing a sealed relationship with the seal housing and contacting and establishing a sealed relationship with the sealing surface of the shaft and being a barrier to a first fluid having a first fluid pressure, the sealing surface of the shaft being relatively movable with respect to the dynamic seal;
   a first portion of the throughbore extending from the first end of the seal housing to the dynamic seal and exposed to the first fluid, and a second portion of the throughbore extending from the dynamic seal to the second end of the seal housing and exposed to a second fluid, wherein all of the first and second portions of the throughbore being larger than the sealing surface of the shaft and being located radially outward of and encircling the sealing surface of the shaft;
   an axially compressed inner sliding seal and an axially compressed outer sliding seal in face sealing contact with the seal housing, the inner and outer sliding seals and the dynamic seal cooperating to define first, second and third sealed portions of the seal housing in sealingly isolated relationship from one another:
      the first sealed portion of the seal housing being exposed to the first fluid, the first fluid pressure producing a first fluid pressure-generated force acting axially on the seal housing with a first force magnitude;
      the second sealed portion of the seal housing being exposed to the second fluid having a second fluid pressure producing a second fluid pressure-generated force acting axially on the seal housing with a second force magnitude, the second fluid-pressure generated force acting in axial opposition to the first fluid pressure-generated force, the first force magnitude being different than the second force magnitude;
      the third sealed portion of the seal housing being exposed to a balancing fluid having a balancing fluid pressure producing a fluid pressure-generated balancing force acting axially on the seal housing, the balancing fluid pressure having a pressure magnitude;
      the first, second and third sealed portions being separate and distinct from one another and lacking fluid communication with one another;
      the inner and outer sliding seals defining the third sealed portion of the seal housing exposed to the balancing fluid, wherein one of the inner and outer sliding seals is located between the balancing fluid and the second fluid and is a barrier separating the balancing fluid from the second fluid; and a pressure supply mechanism automatically controlling the pressure magnitude of the balancing fluid such that the fluid pressure-generated forces acting axially on the seal housing produce a negligible net fluid pressure-generated axial force on the seal housing.

2. The dynamic sealing mechanism of claim 1, wherein the shaft is relatively rotatable with respect to the seal housing.

3. The dynamic sealing mechanism of claim 1, wherein the shaft moves longitudinally in both directions relative to the seal housing.

4. The dynamic sealing mechanism of claim 1, wherein the inner and outer sliding seals accommodate relative lateral motion of the seal housing.

5. The dynamic sealing mechanism of claim 4, wherein the balancing fluid pressure is distributed around a transverse balancing area of the seal housing by an annular distribution channel, the balancing fluid being communicated to the annular distribution channel by a pressure communication path, the pressure communication path comprising a generally axially oriented hole formed in one of the components selected from a component group consisting of the pressure housing, the retaining member, and the seal housing, and the pressure communication path opening into the annular distribution channel.

6. The dynamic sealing mechanism of claim 4, wherein at least one of the inner and outer sliding seals is an elastomeric seal that has been treated with a low breakout friction treatment.

7. The dynamic sealing mechanism of claim 5, wherein
the first fluid pressure-generated force is generated by the pressure of the first fluid acting over an annular first transverse pressure area of the seal housing, the first transverse pressure area defined by a first inner pressure boundary and a first outer pressure boundary, wherein the first inner pressure boundary is established by the sealing surface of the shaft and the first outer pressure boundary is established by the inner sliding seal; and
the second fluid pressure-generated force is generated by the pressure of the second fluid acting over an annular second transverse pressure area of the seal housing, the second transverse pressure area defined by a second inner pressure boundary and a second outer pressure boundary, wherein the second inner pressure boundary is established by the sealing surface of the shaft and the second outer pressure boundary is established by the outer sliding seal.

8. The dynamic sealing mechanism of claim 7, wherein the second fluid pressure is greater than the first fluid pressure.

9. The dynamic sealing mechanism of claim 8, wherein the second fluid pressure is produced by a pressure supply that circulates the second fluid through an orifice having an orifice size that is controlled by a computer.

10. The dynamic sealing mechanism of claim 9, wherein the computer monitors the first fluid pressure with a pressure transducer.

11. The dynamic sealing mechanism of claim 8, wherein the second fluid pressure is produced by a pressure supply that circulates the second fluid through an orifice, wherein the rate of circulation of the second fluid is controlled by a computer, the computer monitoring the first fluid pressure with a pressure transducer.

12. The dynamic sealing mechanism of claim 8, wherein the second fluid pressure is produced by a pressure supply that circulates the second fluid through an orifice, wherein the rate of circulation is controlled by a computer.

13. The dynamic sealing mechanism of claim 7, wherein the balancing fluid pressure is greater than the second fluid pressure, and the second fluid pressure is no less than the first fluid pressure.

14. The dynamic sealing mechanism of claim 7, wherein the pressure supply mechanism comprises:
a stepped piston and first and second reciprocating seals, the first and second reciprocating seals establishing first and second transverse sealed areas and a sealed chamber having a transverse sealed balancing area, wherein the ratios of the first transverse sealed area to the second transverse sealed area to the transverse sealed balancing area of the stepped piston are substantially matched to the ratios of the first transverse pressure area to the second transverse pressure area to the transverse balancing area of the seal housing;
the sealed chamber being located between the first and second reciprocating seals, the balancing fluid being communicated from the sealed chamber to the third sealed portion of the seal housing by a pressure communication path, the pressure communication path comprising a generally axially oriented hole formed in one of the components selected from a component group consisting of the pressure housing, the retaining member, and the seal housing; and
at least two fluid pressure-generated piston forces configured to act on the stepped piston to produce a net fluid pressure-generated axial piston force, the first fluid pressure-generated piston force generated by the first fluid pressure acting over the first transverse sealed area and the second fluid pressure-generated piston force generated by the second fluid pressure acting over the second transverse sealed area, the second fluid pressure-generated piston force acting in opposition to the first fluid pressure-generated piston force;
wherein the net fluid pressure-generated axial piston force is reacted by the balancing fluid within the transverse sealed balancing area.

15. The dynamic sealing mechanism of claim 14, wherein the stepped piston is located at least partially within a recess of the pressure housing and the generally axially oriented hole is formed in the pressure housing.

16. The dynamic sealing mechanism of claim 14, wherein the seal housing has an outer peripheral surface, the stepped piston is located at least partially within a generally axially oriented recess of the seal housing that is located radially between the sealing surface of the shaft and the outer peripheral surface of the seal housing, and the generally axially oriented hole is formed in the seal housing, and is located radially outward of the dynamic seal and radially between the dynamic seal and the outer peripheral surface of the seal housing.

17. The dynamic sealing mechanism of claim 14, wherein the stepped piston is located at least partially within a hydraulic cylinder, the hydraulic cylinder being mounted at least partially within the pressure housing and the generally axially oriented hole is formed in the pressure housing.

18. The dynamic sealing mechanism of claim 14, wherein the stepped piston is located at least partially within a hydraulic cylinder, the hydraulic cylinder being mounted external to the pressure housing and the generally axially oriented hole is formed in the pressure housing.

19. The dynamic sealing mechanism of claim 14, wherein the pressure of the first fluid is transmitted to the stepped piston via an intermediate clean fluid.

20. The dynamic sealing mechanism of claim 19, wherein the first fluid and the intermediate clean fluid are partitioned by a fluid separator.

21. The dynamic sealing mechanism of claim 20, wherein the fluid separator is a diaphragm.

22. The dynamic sealing mechanism of claim 4, wherein the inner and outer sliding seals are axially compressed seals in face sealing contact with the pressure housing, an annular sealed region located between the inner and outer sliding seals, the pressure of the balancing fluid communicated from the pressure supply mechanism to the annular sealed region by a pressure communication path, the pressure communication path comprising a generally axially oriented hole formed in the pressure housing, at least part of the generally axially oriented hole located radially inward from the outer sliding seal and radially outward from the inner sliding seal, an open end of the generally axially oriented hole opening into the sealed region between the inner and outer sliding seals.

23. The dynamic sealing mechanism of claim 4, wherein the inner and outer sliding seals are axially compressed seals in face sealing contact with the retaining member, an annular sealed region located between the inner and outer sliding seals, the pressure of the balancing fluid communicated from the pressure supply mechanism to the annular sealed region by a pressure communication path, the pressure communication path comprising a generally axially oriented hole formed in the retaining member, at least part of the generally axially oriented hole located radially inward from the outer sliding seal and radially outward from the inner sliding seal, an open end of the generally axially oriented hole opening into the sealed region between the inner and outer sliding seals.

24. The dynamic sealing mechanism of claim 1, wherein the first fluid pressure-generated force is generated by the pressure of the first fluid acting over a first transverse pressure area defined by inner and outer pressure boundaries, wherein the inner pressure boundary is established by the sealing surface of the shaft.

25. The dynamic sealing mechanism of claim 1, wherein the second fluid pressure-generated force is generated by the pressure of the second fluid acting over a second transverse pressure area defined by inner and outer pressure boundaries, wherein the inner pressure boundary is established by the sealing surface of the shaft.

26. The dynamic sealing mechanism of claim 1, further comprising an anti-rotation projection that substantially prevents relative rotation between the seal housing and the pressure housing.

27. The dynamic sealing mechanism of claim 26, wherein the anti-rotation projection is axially oriented.

28. The dynamic sealing mechanism of claim 26, wherein the anti-rotation projection is radially oriented.

29. The dynamic sealing mechanism of claim 1, further comprising at least one radial bearing positioned radially by the shaft and locating the radial position of the seal housing.

30. The dynamic sealing mechanism of claim 29, wherein the at least one radial bearing is a journal bearing.

31. The dynamic sealing mechanism of claim 29, wherein the at least one radial bearing is a rolling element bearing.

32. The dynamic sealing mechanism of claim 1, wherein the retaining member is secured to the pressure housing by at least one retention feature.

33. The dynamic sealing mechanism of claim 32, wherein the retention feature is at least one threaded fastener threadedly engaged with the pressure housing.

34. The dynamic sealing mechanism of claim 1, wherein the retaining member is threadedly fastened to the pressure housing by threads that are threadedly engaged with the pressure housing.

35. The dynamic sealing mechanism of claim 1, wherein the dynamic seal establishes a sealing footprint against the sealing surface of the shaft, the sealing footprint having a wavy hydrodynamic footprint edge.

36. A dynamic sealing mechanism for a machine assembly, comprising:
a retaining member;
a seal housing having opposed first and second ends, the retaining member capturing the seal housing axially relative to a pressure housing, allowing the seal housing to move laterally relative to the pressure housing;
a shaft having an external sealing surface of generally cylindrical form passing completely through the seal housing and being relatively movable with respect to the seal housing;
a dynamic seal contacting and establishing a sealed relationship with the seal housing and encircling and contacting the sealing surface of the shaft and establishing a sealed relationship therewith;
an inner sliding seal and an outer sliding seal in face sealing contact with the seal housing and located radially outward of and encircling the sealing surface of the shaft,
the dynamic seal and the inner sliding seal defining a seal housing first sealed portion exposed to a first fluid having a first fluid pressure producing a first fluid pressure-generated force acting axially on the seal housing with a first force magnitude;
the dynamic seal and outer sliding seal defining a seal housing second sealed portion exposed to a second fluid having a second fluid pressure producing a second fluid pressure-generated force acting axially on the seal housing with a second force magnitude, the second fluid-pressure generated force acting in axial opposition to the first fluid pressure-generated force, the first force magnitude being different than the second force magnitude;
the inner and outer sliding seals defining a seal housing third sealed portion exposed to a balancing fluid having a balancing fluid pressure producing a fluid pressure-generated balancing force acting axially on the seal housing, the balancing fluid pressure having a pressure magnitude;
wherein the first, second and third sealed portions are separate and distinct from one another and lack fluid communication with one another; and
a pressure supply mechanism automatically controlling the pressure magnitude of the balancing fluid such that the fluid pressure-generated forces acting axially on the seal housing produce a negligible net fluid pressure-generated axial force on the seal housing.

37. The dynamic sealing mechanism of claim 36, wherein the inner and outer sliding seals are in face sealing contact with the first end of the seal housing, an annular sealed region being located between the inner and outer sliding seals, the pressure of the balancing fluid being communicated from the pressure supply mechanism to the annular sealed region by a pressure communication path, the pressure communication path comprising a generally axially oriented hole formed in one of the components selected from the component group consisting of the pressure housing, the retaining member, and the seal housing, at least part of the generally axially oriented hole being located radially inward from the outer sliding seal and radially outward from the inner sliding seal, an open end of the generally axially oriented hole opening into the sealed region between the inner and outer sliding seals.

38. A dynamic sealing mechanism for a machine assembly, comprising:
a pressure housing;
a shaft located at least partially within the pressure housing and relatively movable with respect to the pressure housing, the shaft having a sealing surface of generally cylindrical form;
an annular seal housing having a generally axially oriented bore extending completely therethrough and first and second ends in axially opposed relation to one another, the first and second ends being located directly radially outward of and encircling the sealing surface, the seal housing having equal opposite axially-facing areas, the sealing surface extending completely through the seal housing and the seal housing positioned axially relative to the pressure housing and laterally movable relative to the pressure housing, the seal housing being positioned laterally by the sealing surface of the shaft;
a dynamic seal contacting and establishing a sealed relationship with the seal housing and contacting and encircling the sealing surface of the shaft and establishing a sealed relationship therewith;
a first portion of the bore being located between the first end of the seal housing and the dynamic seal, and a second portion of the bore being located between the dynamic seal and the second end of the seal housing, the first and second portions of the bore being larger than the sealing surface of the shaft, and being located radially outward of and encircling the sealing surface of the shaft, the entire bore being larger than the sealing surface;
an annular inner sliding seal and an annular outer sliding seal in face sealing contact with the first end of the seal housing defining a sealed axially-facing balancing area of the seal housing, the balancing area comprising the axially-facing area sealed by and between the inner and outer sliding seals;
the inner sliding seal and the dynamic seal defining an axially-facing first effective area of the first end of the seal housing;
the outer sliding seal and the dynamic seal defining an axially-facing net second effective area of the second end of the seal housing,
wherein the axially-facing first effective area is exposed to a first fluid having a first fluid pressure producing a first fluid pressure-generated force acting axially on the seal housing with a first force magnitude,
the axially-facing net second effective area is exposed to a second fluid having a second fluid pressure producing a second fluid pressure-generated force acting axially on the seal housing with a second force magnitude, the second fluid-pressure generated force acting in opposition to the first fluid pressure-generated force, the first force magnitude being different than the second force magnitude, and
the axially-facing balancing area is exposed to a balancing fluid having a balancing fluid pressure producing a fluid pressure-generated balancing force acting axially on the seal housing, the balancing fluid pressure having a pressure magnitude; and
a pressure supply mechanism automatically controlling the pressure magnitude of the balancing fluid causing the fluid pressure-generated forces acting axially on the seal housing to produce a negligible net fluid pressure-generated axial force on the seal housing.

39. The dynamic sealing mechanism of claim 37, wherein the seal housing has an inner periphery facing generally radially inward and an outer periphery facing generally radially outward, and a fluid path communicates between the inner and outer peripheries, the fluid path being located between the dynamic seal and the second end of the seal housing.

40. The dynamic sealing mechanism of claim 36, wherein the seal housing incorporates a pressure communication path communicating between the seal housing third sealed portion and the pressure supply mechanism, the balancing fluid located within the pressure communication path and communicated to the seal housing third sealed portion through the pressure communication path, the pressure communication path having an open end facing toward the seal housing, the radial distance between the open end and the shaft being greater than the radial distance between the inner sliding seal and the shaft and being less than the radial distance between the outer siding seal and the shaft.

41. The dynamic sealing mechanism of claim 1, wherein the contact of the inner and outer sliding seals with the seal housing occurs at the first end of the seal housing, the seal housing has an inner periphery facing generally radially inward and an outer periphery facing generally radially outward, and a fluid path communicates between the inner and outer peripheries, an annular sealed region being located between the inner and outer sliding seals, the pressure of the balancing fluid being communicated from the pressure supply mechanism to the annular sealed region by a pressure communication path, the pressure communication path comprising a generally axially oriented hole in one of the components selected from a component group consisting of the pressure housing, the retaining member, and the seal housing; at least part of the generally axially oriented hole being located radially inward from the outer sliding seal and radially outward from the inner sliding seal, an open end of the generally axially oriented hole opening into the annular sealed region between the inner and outer sliding seals.

42. The dynamic sealing mechanism of claim 1, wherein the seal housing incorporates a pressure communication path communicating between the seal housing third sealed portion and the pressure supply mechanism, the balancing fluid located within the pressure communication path and communicated to the seal housing third sealed portion through the pressure communication path, the pressure communication path comprising a generally axially oriented hole in one of the components selected from a component group consisting of the pressure housing and the retaining member; at least part of the generally axially oriented hole being located radially inward from and encircled by the outer sliding seal and being located radially outward from the inner sliding seal, at least part of the generally axially oriented hole being located radially between the inner and outer sliding seals.

43. The dynamic sealing mechanism of claim 38, wherein the seal housing has an outer periphery facing generally radially outward, and a fluid path connects and communicates between the outer periphery and the bore, the fluid path being located between the dynamic seal and the second end of the seal housing.

44. The dynamic sealing mechanism of claim 36, wherein the pressure supply mechanism comprises a stepped piston exposed to the first and second fluid pressures and exposed to the balancing fluid, and in sealed contact with first and second reciprocating seals, a sealed chamber being located between the first and second reciprocating seals, the balancing fluid being communicated from the sealed chamber to the third sealed portion of the seal housing by a pressure communication path, the pressure communication path comprising a generally axially oriented hole formed in one of the components selected from a component group consisting of the pressure housing, the retaining member, and the seal housing, an open end of the pressure communication path being located radially inward from the outer sliding seal and radially outward from the inner sliding seal, and radially between the inner and outer sliding seals.

45. The dynamic sealing mechanism of claim 38, wherein the pressure supply mechanism comprises a stepped piston exposed to the first and second fluid pressures and exposed to the balancing fluid, and in sealed contact with first and second reciprocating seals, a sealed chamber being located between the first and second reciprocating seals, the balancing fluid being communicated from the sealed chamber to the sealed axially-facing balancing area of the seal housing by a pressure communication path, the pressure communication path comprising a generally axially oriented hole formed in one of the components selected from a component group consisting of the pressure housing, the retaining member, and the seal housing; an open end of the pressure communication path being located radially inward from the outer sliding seal and radially outward from the inner sliding seal, and radially between the inner and outer sliding seals.

46. The dynamic sealing mechanism of claim 1, wherein the diameter of the sealing surface of the shaft has a uniform diameter.

47. A dynamic sealing mechanism for a machine assembly, comprising:
   a pressure housing;
   a retaining member;
   an annular seal housing having opposed first and second ends, a generally axially oriented throughbore, and an outer periphery, the retaining member capturing the annular seal housing axially relative to the pressure housing while allowing the annular seal housing to move laterally relative to the pressure housing, the annular seal housing being located at least partially within the pressure housing;
   a shaft having an external sealing surface of generally cylindrical form, the throughbore being larger than the sealing surface of the shaft, and the sealing surface of the shaft extending completely through the annular seal housing from the first end to the second end of the annular seal housing, and locating the annular seal housing laterally;
   a dynamic seal contacting and being axially located by the annular seal housing and contacting and establishing a sealed relationship with the shaft sealing surface of the shaft and being a barrier to a first fluid having a first pressure, the shaft sealing surface of the shaft being relatively movable with respect to the dynamic seal and with respect to the annular seal housing;
   the throughbore having first and second throughbore portions, the first throughbore portion being located between the dynamic seal and the first end of the annular seal housing and the second throughbore portion being located between the dynamic seal and the second end of the annular seal housing;
   axially compressed inner and outer sliding seals in face sealing contact with the first end of the annular seal housing, the inner and outer sliding seals located directly radially outward from and encircling the sealing surface of the shaft, the inner and outer sliding seals cooperating to define a balancing area on the first end of the annular seal housing, a pressure communication path penetrating and communicating through at least a portion of the pressure housing to the balancing area, the pressure communication path comprising at least one hole in the pressure housing,
   the dynamic seal and the inner sliding seal being exposed to the first fluid, the dynamic seal and the outer sliding seal being exposed to and retaining a second fluid having a second pressure, the second pressure being greater than the first pressure,
   at least a portion of the first end of the annular seal housing being exposed to the first fluid and at least a portion of the first end of the annular seal housing being exposed to the second fluid, the first pressure producing an axially acting hydraulic force on at least a portion of the first end of the annular seal housing in a first axial direction, the second pressure creating an axially acting hydraulic force on at least a portion of the first end of the annular seal housing in the first axial direction and creating an axially acting hydraulic force on at least a portion of the second end of the annular seal housing in a second axial direction, the first axial direction being opposite to the second axial direction, the first throughbore portion of the annular seal housing being exposed to the first fluid, at least part of the first throughbore portion being located directly radially outward of and encircling the sealing surface of the shaft, and the first and second ends of the seal housing being located directly radially outward of and encircling the sealing surface of the shaft.

48. The dynamic sealing mechanism of claim 47, wherein the annular seal housing includes a penetration from the throughbore to the outer periphery creating a fluid path, the fluid path being located between the dynamic seal and the second end of the seal housing.

49. The dynamic sealing mechanism of claim 47, wherein the pressure housing has an outer peripheral surface, and the at least one hole of the pressure communication path penetrates the outer peripheral surface of the pressure housing, the pressure communication path having an open end located radially inward of and encircled by the outer sliding seal and located radially outward of the inner sliding seal, the open end being located radially between the inner and outer sliding seals.

50. The dynamic sealing mechanism of claim 47, wherein the dynamic seal establishes a sealed relationship with the annular seal housing.

51. The dynamic sealing mechanism of claim 47, wherein the throughbore of the annular seal housing includes at least one annular groove.

52. The dynamic sealing mechanism of claim 47, wherein the second end of the annular seal housing includes an annular recess.

53. The dynamic sealing mechanism of claim 47, wherein the outer periphery of the annular seal housing includes at least one radially oriented projection.

54. The dynamic sealing mechanism of claim 47, wherein the outer periphery of the annular seal housing includes at least one radially oriented recess.

55. A dynamic sealing mechanism for a machine assembly, comprising:
   a retaining member;
   an annular seal housing having opposed first and second ends and inner and outer peripheries, the retaining member capturing the annular seal housing axially relative to a pressure housing, allowing the annular seal housing to move laterally relative to the pressure housing;
   a shaft having an external sealing surface of generally cylindrical form located at least partially within the annular seal housing;

a dynamic seal contacting and axially located by the annular seal housing and encircling and contacting the sealing surface of the shaft and establishing a sealed relationship therewith, the sealing surface of the shaft being relatively movable with respect to the dynamic seal and the annular seal housing;

an inner sliding seal and an outer sliding seal in face sealing contact with the first end of the annular seal housing and encircling and radially spaced from the shaft, the radial space between the outer sliding seal and the shaft being greater than the radial space between the inner sliding seal and the shaft;

the dynamic seal and the inner sliding seal defining an annular seal housing first sealed portion exposed to a first fluid having a first pressure, the dynamic seal, the inner sliding seal, and at least a part of the inner periphery of the annular seal housing being exposed to the first fluid;

at least part of the first end of the annular seal housing and at least a part of the second end of the annular seal housing being exposed to a second fluid having a second pressure, the second pressure being greater than the first pressure, the dynamic seal and the outer sliding seal being exposed to and retaining the second fluid;

the inner and outer sliding seals defining an annular housing balancing area, the first sealed portion and the annular housing balancing area being separate and distinct from one another and lacking fluid communication with one another; and a pressure communication path penetrating and communicating through the pressure housing to the balancing area, the pressure communication path comprising at least one hole in the pressure housing having an open end opening into the balancing area and facing toward the annular seal housing, the radial distance between the open end and the shaft being greater than the radial distance between the inner sliding seal and the shaft and being less than the radial distance between the outer siding seal and the shaft.

56. The dynamic sealing mechanism of claim 55, wherein at least part of the annular housing balancing area is exposed to a balancing fluid having a balancing fluid pressure producing a fluid pressure-generated balancing force acting axially on the annular seal housing, the balancing fluid pressure having a pressure magnitude; and a pressure supply mechanism automatically controlling the pressure magnitude of the balancing fluid such that the fluid pressure-generated forces acting axially on the annular seal housing produce a negligible net fluid pressure-generated axial force on the annular seal housing; the pressure communication path comprising at least one generally axially oriented hole communicating the balancing fluid from the pressure supply mechanism to the annular housing balancing area.

57. The dynamic sealing mechanism of claim 55, wherein the pressure housing has an outer peripheral surface, and the at least one hole of the pressure communication path penetrates the outer peripheral surface of the pressure housing.

58. The dynamic sealing mechanism of claim 55, wherein the dynamic seal establishes a sealed relationship with the annular seal housing.

59. The dynamic sealing mechanism of claim 55, wherein the inner periphery of the annular seal housing includes at least one annular groove.

60. The dynamic sealing mechanism of claim 55, wherein the second end of the annular seal housing includes an annular recess.

61. The dynamic sealing mechanism of claim 55, wherein the outer periphery of the annular seal housing includes at least one radially oriented projection.

62. The dynamic sealing mechanism of claim 55, wherein the outer periphery of the annular seal housing incorporates at least one radially oriented recess.

63. A dynamic sealing mechanism for a machine assembly, comprising:

a pressure housing;

a shaft located at least partially within the pressure housing and relatively movable with respect to the pressure housing, the shaft having a sealing surface of generally cylindrical form;

an annular seal housing having a generally axially oriented bore extending completely through the annular seal housing, an outer periphery, and first and second ends in axially opposed relation to one another, all of the first and second ends being located radially outward of and encircling the shaft sealing surface, and the entire bore being larger than the shaft sealing surface of the shaft, the sealing surface extending completely through the annular seal housing from the first end to the second end, and the annular seal housing positioned axially relative to the pressure housing and laterally movable relative to the pressure housing, the annular seal housing being positioned laterally by the sealing surface of the shaft;

a dynamic seal contacting and located at least partially within the annular seal housing and contacting the sealing surface of the shaft and establishing a sealed relationship therewith, the sealing surface of the shaft being relatively movable with respect to the dynamic seal and with respect to the annular seal housing;

an annular inner sliding seal and an annular outer sliding seal in face sealing contact with the first end of the annular seal housing and defining a sealed axially-facing balancing area on the first end of the annular seal housing, the balancing area comprising the area sealed by and between the inner and outer sliding seals;

the inner sliding seal and the dynamic seal being located radially outward of and encircling the sealing surface of the shaft and defining an axially-facing first effective area of the first end of the annular seal housing;

the second end of the annular seal housing having an axially-facing net second effective area having inner and outer boundaries, the dynamic seal defining at least one of the inner and outer boundaries, wherein the axially-facing first effective area is exposed to a first fluid having a first pressure producing a first pressure-generated force acting axially on the annular seal housing with a first force magnitude, the dynamic seal and the inner sliding seal being exposed to the first fluid, and the dynamic seal and the outer sliding seal being exposed to a second fluid having a second pressure, the second pressure being greater than the first pressure;

the second fluid producing a second pressure-generated force acting axially on the axially-facing net second effective area of the annular seal housing with a second force magnitude, the second fluid-pressure generated force acting in opposition to the first pressure-generated force, the first force magnitude being less than the second force magnitude, and a pressure communication path communicating with the balancing area and having an open end opening into the balancing area and facing the annular seal housing, the radial distance between the open end and the shaft being greater than the radial distance between the inner sliding seal and the shaft and being less than the radial distance between the outer siding seal and the shaft.

64. The dynamic sealing mechanism of claim 63, wherein at least one fluid communication path creates a penetration of the annular seal housing from the annular seal housing bore to the outer periphery of the annular seal housing.

65. The dynamic sealing mechanism of claim 63, wherein the pressure housing has an outer peripheral surface, and the pressure communication path comprises at least one hole penetrating the outer peripheral surface of the pressure housing.

66. The dynamic sealing mechanism of claim 63, wherein the dynamic seal establishes a sealed relationship with the annular seal housing.

67. The dynamic sealing mechanism of claim 63, wherein the bore of the annular seal housing includes at least one annular groove.

68. The dynamic sealing mechanism of claim 63, wherein the second end of the annular seal housing includes an annular recess.

69. The dynamic sealing mechanism of claim 63, wherein the outer periphery of the annular seal housing incorporates at least one radially oriented projection.

70. The dynamic sealing mechanism of claim 63, wherein the outer periphery of the annular seal housing incorporates at least one radially oriented recess.

71. A dynamic sealing mechanism for a machine assembly, comprising:
a pressure housing assembly comprising an upper housing and a lower housing;
a shaft located at least partially within the pressure housing assembly and relatively movable with respect to the pressure housing assembly, the shaft having a sealing surface of generally cylindrical form and uniform diameter;
an annular seal housing having first and second ends in axially opposed relation to one another and a generally axially oriented bore extending completely therethrough, the sealing surface of the shaft extending completely through the annular seal housing from the first end to the second end, and extending completely through the seal housing bore;
the pressure housing assembly capturing the seal housing axially relative to the pressure housing assembly while allowing the seal housing to move laterally relative to the pressure housing assembly;
a first seal disposed between the seal housing and the sealing surface of the shaft, the first seal maintaining sealing contact to limit fluid flow between the seal housing and the sealing surface of the shaft;
a second seal disposed between the seal housing and the pressure housing assembly, the second seal maintaining sealing contact to limit fluid flow between the seal housing and the pressure housing assembly;
a third seal disposed between the seal housing and the pressure housing assembly, the third seal maintaining sealing contact to limit fluid flow between the seal housing and the pressure housing assembly;
the first and second seals defining a seal housing first sealed portion exposed to a first fluid having a first fluid pressure producing a first fluid pressure-generated force acting axially on the seal housing with a first force magnitude;
the first and third seals defining a seal housing second sealed portion exposed to a second fluid having a second fluid pressure producing a second fluid pressure-generated force acting axially on the seal housing with a second force magnitude, the second fluid-pressure generated force acting in axial opposition to the first fluid pressure-generated force, the first force magnitude being different than the second force magnitude;
the second and third seals defining a seal housing third sealed portion exposed to a balancing fluid having a balancing fluid pressure producing a fluid pressure-generated balancing force acting axially on the seal housing, the balancing fluid pressure having a pressure magnitude;
wherein the first, second and third sealed portions are separate and distinct from one another and lack fluid communication with one another; and
a pressure supply mechanism automatically pressurizing the balancing fluid to a pressure magnitude such that the fluid pressure-generated balancing force and the first and second fluid pressure-generated forces acting axially on the seal housing produce a negligible net fluid pressure-generated axial force on the seal housing.

72. The dynamic sealing mechanism of claim 1, wherein the first and second ends of the annular seal housing are larger than the sealing surface of the shaft, and are located radially outward of, and encircle the sealing surface.

73. The dynamic sealing mechanism of claim 1, wherein the retaining member is located radially outward of at least a portion of the sealing surface of the shaft and surrounds at least a portion of the sealing surface.

74. The dynamic sealing mechanism of claim 1, wherein the shaft has lateral motion relative to the pressure housing, and the seal housing follows the lateral motion and has lateral motion relative to the pressure housing and the retaining member.

75. The dynamic sealing mechanism of claim 1, wherein a pressure communication path communicates the balancing fluid and the pressure of the balancing fluid to the third sealed portion of the seal housing, the pressure communication path comprising a cross-drilled hole formed in the pressure housing, at least part of the cross-drilled hole being a generally axially oriented hole, the radial distance between the hole and the shaft being greater than the radial distance between the inner sliding seal and the shaft, and being less than the radial distance between the outer siding seal and the shaft.

76. The dynamic sealing mechanism of claim 1, wherein a pressure communication path communicates the balancing fluid and the pressure of the balancing fluid to the third sealed portion of the seal housing, the pressure communication path comprising a cross-drilled hole formed in the retaining member, at least part of the cross-drilled hole being a generally axially oriented hole having an open end, the radial distance between the open end and the shaft being greater than the radial distance between the inner sliding seal and the shaft, and being less than the radial distance between the outer siding seal and the shaft.

77. The dynamic sealing mechanism of claim 1, wherein the pressure housing has inner and outer seal grooves of annular form opening toward the first end of the seal housing and encircling the sealing surface of the shaft, the outer seal groove encircling the inner seal groove, the inner sliding seal contacting and being located at least partially in the inner seal groove, the outer sliding seal contacting and being located at least partially in the outer seal groove, a pressure communication path communicating the balancing fluid and the pressure of the balancing fluid to the third sealed portion of the seal housing, at least part of the pressure communication path comprising a hole, the radial distance between the hole and the shaft being greater than the radial distance between the inner sliding seal and the shaft, and being less than the radial distance between the outer siding seal and the shaft.

78. The dynamic sealing mechanism of claim 1, wherein the retaining member has an innermost inwardly facing peripheral surface having a innermost retainer diameter, and the second portion of the throughbore having a throughbore diameter, the throughbore diameter being smaller than the innermost retainer diameter.

79. The dynamic sealing mechanism of claim 1, wherein the pressure housing has an innermost inwardly facing peripheral surface having a innermost pressure housing diameter, and the second portion of the throughbore having a throughbore diameter, the throughbore diameter being smaller than the innermost pressure housing diameter.

80. The dynamic sealing mechanism of claim 1, further comprising a sealing element of annular form contacting and establishing sealing between the retaining member and the pressure housing, the sealing element located radially outward of and encircling the sealing surface of the shaft.

81. The dynamic sealing mechanism of claim 1, wherein the sealing surface of the shaft passes completely through the retaining member.

82. The dynamic sealing mechanism of claim 1, wherein the seal housing incorporates a stepped hole that extends from the first end to the second end, a stepped piston of the pressure supply mechanism located within at least part of the stepped hole, and at least part of the stepped hole forming a pressure communication path communicating the balancing fluid and the pressure of the balancing fluid to the third sealed portion of the seal housing, at least part of the stepped bore located radially outward from the dynamic seal.

83. The dynamic sealing mechanism of claim 1, wherein a retaining surface of the retaining member is separated from a retaining surface of the pressure housing by an axial dimension, and at least a portion of the seal housing located directly between the retaining surface of the retaining member and the retaining surface of the pressure housing, the at least a portion of the seal housing having an axial length between the first and second ends of the seal housing, the axial dimension separating the retaining surface of the retaining member from the retaining surface of the pressure housing is greater than the axial length of the at least a portion of the seal housing to allow the seal housing to move radially in response to any lateral motion of the shaft.

84. The dynamic sealing mechanism of claim 1, wherein no sealing element contacts both the retaining member and the seal housing, and the retaining member is not sealed with respect to the seal housing.

85. The dynamic sealing mechanism of claim 1, wherein no sealing element contacts both the retaining member and the pressure housing, and the retaining member is not sealed with respect to the pressure housing.

86. The dynamic sealing mechanism of claim 1, wherein no sealing element contacts the retaining member.

87. The dynamic sealing mechanism of claim 1, wherein the pressure housing has a pressure communication path passing through at least part of the pressure housing and having an open end located between the inner and outer sliding seals, the pressure communication path communicating the balancing fluid and the pressure of the balancing fluid between the inner and outer sliding seals.

88. The dynamic sealing mechanism of claim 1, wherein the sealing surface of the shaft passes completely through the retaining member, all of the retaining member being larger than and located radially outward of the sealing surface of the shaft.

89. The dynamic sealing mechanism of claim 1, wherein the retaining member surrounds a portion of the seal housing and surrounds part of the second portion of the throughbore of the seal housing.

90. The dynamic sealing mechanism of claim 1, wherein the retaining member surrounds the second end of the seal housing.

91. The dynamic sealing mechanism of claim 1, wherein all of the pressure housing is larger than the sealing surface of the shaft, and all of the pressure housing is larger than the throughbore of the seal housing.

92. The dynamic sealing mechanism of claim 1, wherein the radial distance between the pressure housing and the sealing surface of the shaft is greater than the radial distance between the throughbore of the seal housing and the sealing surface of the shaft.

93. The dynamic sealing mechanism of claim 1, wherein the radial distance between the retaining member and the sealing surface of the shaft is greater than the radial distance between the throughbore of the seal housing and the sealing surface of the shaft.

94. The dynamic sealing mechanism of claim 1, wherein all of the retaining member is larger than the sealing surface of the shaft and the sealing surface passes completely through the retaining member.

95. The dynamic sealing mechanism of claim 1, wherein a portion of the retaining member is located radially outward of and surrounds a portion of the pressure housing.

96. The dynamic sealing mechanism of claim 1, wherein the pressure housing has an innermost surface of annular form, and the innermost surface is larger than the sealing surface of the shaft and encircles at least part of the sealing surface.

97. The dynamic sealing mechanism of claim 1, wherein all of the seal housing is larger than and located radially outward of the sealing surface of the shaft.

98. The dynamic sealing mechanism of claim 1, wherein all of the retaining member is larger than the sealing surface of the shaft.

99. The dynamic sealing mechanism of claim 1, wherein all of the pressure housing is larger than the sealing surface of the shaft.

100. The dynamic sealing mechanism of claim 1, wherein the retaining member is located radially outward of, and surrounds the dynamic seal.

101. The dynamic sealing mechanism of claim 1, wherein the shaft has an axis and the radial distance between the retaining member and the axis of the shaft is greater than the radial distance between the sealing surface of the shaft and the axis of the shaft.

102. The dynamic sealing mechanism of claim 1, wherein the shaft has an axis and the radial distance between the retaining member and the axis of the shaft is greater than the radial distance between the seal housing and the axis of the shaft.

103. The dynamic sealing mechanism of claim 1, wherein the outer sliding seal encircles the inner sliding seal.

104. The dynamic sealing mechanism of claim 1, wherein the retaining member has an inner peripheral surface facing generally radially inward toward and surrounding at least part of the shaft, the inner peripheral surface contacting the second fluid.

105. The dynamic sealing mechanism of claim 1, wherein at least part of the seal housing is located inside the retaining member.

106. The dynamic sealing mechanism of claim 1, wherein the retaining member encircles at least part of the sealing surface of the shaft.

107. The dynamic sealing mechanism of claim 1, wherein the shaft has an axis and the radial distance between the first end of the seal housing and the axis of the shaft is greater than the radial distance between the sealing surface of the shaft and the axis of the shaft, and the radial distance between the second end of the seal housing and the axis of the shaft is no less than the radial distance between the sealing surface of the shaft and the axis of the shaft.

108. The dynamic sealing mechanism of claim 1, wherein the retaining member has an innermost surface of annular form, the innermost surface of the retaining member being larger than the sealing surface of the shaft and encircling at least part of the sealing surface.

109. The dynamic sealing mechanism of claim 1, wherein the inner and outer sliding seals are located radially outward of and encircle the sealing surface of the shaft, the outer sliding seal encircling the inner sliding seal, and both the inner and the outer sliding seals contacting the first end of the seal housing.

110. The dynamic sealing mechanism of claim 1, wherein the inner sliding seal is located between and exposed to the first fluid and the balancing fluid and sealing the first fluid from the balancing fluid, and the outer sliding seal is located between and exposed to the second fluid and the balancing fluid, and sealing the second fluid from the balancing fluid.

111. The dynamic sealing mechanism of claim 1, wherein at least some of the balancing fluid is located between the inner and outer sliding seals, the inner sliding seal partitioning the balancing fluid from the first fluid, and the outer sliding seal partitioning the balancing fluid from the second fluid.

112. The dynamic sealing mechanism of claim 1, wherein a generally radially oriented hole is formed in the seal housing and located between the dynamic seal and the first end of the seal housing, the hole communicating the first fluid and the pressure of the first fluid to the pressure supply mechanism.

113. The dynamic sealing mechanism of claim 36, wherein the retaining member is located radially outward of at least a portion of the sealing surface of the shaft and surrounds at least a portion of the sealing surface.

114. The dynamic sealing mechanism of claim 36, wherein the seal housing has a throughbore, a first portion of the throughbore located between the first end of the seal housing and the dynamic seal and exposed to the first fluid, and a second portion of the throughbore located between the dynamic seal and the second end of the seal housing and exposed to the second fluid, the first and second portions of the throughbore being larger than the external sealing surface of the shaft, and being located radially outward of and encircling the external sealing surface of the shaft.

115. The dynamic sealing mechanism of claim 114, wherein the retaining member has an innermost inwardly facing peripheral surface having an innermost retainer diameter, and the second portion of the throughbore has a throughbore diameter, the throughbore diameter being smaller than the innermost retainer diameter.

116. The dynamic sealing mechanism of claim 114, wherein the pressure housing has an innermost inwardly facing peripheral surface having an innermost pressure housing diameter, and the second portion of the throughbore has a throughbore diameter, the throughbore diameter being smaller than the innermost pressure housing diameter.

117. The dynamic sealing mechanism of claim 36, wherein the first and second ends of the seal housing are larger than the external sealing surface of the shaft, and are located radially outward of, and encircle the external sealing surface.

118. The dynamic sealing mechanism of claim 36, wherein a pressure communication path communicates the balancing fluid and the pressure of the balancing fluid to the seal housing third sealed portion, the pressure communication path comprising a cross-drilled hole formed in the retaining member, at least part of the cross-drilled hole being a generally axially oriented hole having an open end, the radial distance between the open end and the shaft being greater than the radial distance between the inner sliding seal and the shaft and less than the radial distance between the outer sliding seal and the shaft.

119. The dynamic sealing mechanism of claim 36, wherein the seal housing has inner and outer seal grooves of annular form opening toward the retaining member and encircling the sealing surface of the shaft, the outer seal groove encircling the inner seal groove, the inner sliding seal contacting and being located at least partially in the inner seal groove, the outer sliding seal contacting and being located at least partially in the outer seal groove.

120. The dynamic sealing mechanism of claim 36, further comprising a sealing element of annular form contacting and establishing sealing between the retaining member and the pressure housing, the sealing element located radially outward of and encircling the sealing surface of the shaft.

121. The dynamic sealing mechanism of claim 36, wherein the sealing surface of the shaft passes completely through the retaining member.

122. The dynamic sealing mechanism of claim 36, wherein the seal housing incorporates a stepped hole that extends from the first end to the second end of the seal housing, a stepped piston of the pressure supply mechanism located within at least part of the stepped hole, and at least part of the stepped hole forming a pressure communication path communicating the balancing fluid and the pressure of the balancing fluid to the third sealed portion of the seal housing, at least part of the stepped bore located radially outward from the dynamic seal.

123. The dynamic sealing mechanism of claim 36, wherein no sealing element contacts both the retaining member and the seal housing, and the retaining member is not sealed with respect to the seal housing.

124. The dynamic sealing mechanism of claim 36, wherein no sealing element contacts the retaining member.

125. The dynamic sealing mechanism of claim 36, wherein the pressure housing has a pressure communication path passing through at least part of the pressure housing and having an open end, the pressure communication path communicating the balancing fluid and the pressure of the balancing fluid between the inner and outer sliding seals, the radial distance between the open end and the shaft being greater than the radial distance between the inner sliding seal and the shaft and being less than the radial distance between the outer sliding seal and the shaft.

126. The dynamic sealing mechanism of claim 36, wherein the sealing surface of the shaft passes completely through the retaining member.

127. The dynamic sealing mechanism of claim 36, wherein the shaft has an axis and the radial distance between the retaining member and the axis of the shaft is greater than the radial distance between the sealing surface of the shaft and the axis of the shaft.

128. The dynamic sealing mechanism of claim 36, wherein the shaft has an axis and the radial distance between the retaining member and the axis of the shaft is greater than the radial distance between the seal housing and the axis of the shaft.

129. The dynamic sealing mechanism of claim 36, wherein the outer sliding seal encircles the inner sliding seal.

130. The dynamic sealing mechanism of claim 36, wherein the shaft has an axis and the radial distance between the first end of the seal housing and the axis of the shaft is greater than the radial distance between the sealing surface of the shaft and the axis of the shaft, and the radial distance between the second end of the seal housing and the axis of the shaft is no less than the radial distance between the sealing surface of the shaft and the axis of the shaft.

131. The dynamic sealing mechanism of claim 36, wherein the retaining member has an innermost surface of annular form, the innermost surface of the retaining member being larger than the sealing surface of the shaft and encircling at least part of the sealing surface.

132. The dynamic sealing mechanism of claim 36, wherein a generally radially oriented hole is formed in the seal housing and located between the dynamic seal and the first end of the seal housing, and located between the dynamic seal and the inner sliding seal, the hole communicating the first fluid and the pressure of the first fluid to the pressure supply mechanism.

133. The dynamic sealing mechanism of claim 38, wherein the seal housing is positioned axially relative to the pressure housing by a retaining member of annular form, the retaining member located radially outward of at least a portion of the sealing surface of the shaft and surrounding at least a portion of the sealing surface.

134. The dynamic sealing mechanism of claim 38, wherein a pressure communication path communicates the balancing fluid and the pressure of the balancing fluid to the sealed axially-facing balancing area of the seal housing, the pressure communication path comprising a cross-drilled hole formed in the pressure housing, at least part of the cross-drilled hole being a generally axially oriented hole having an open end located radially outward of the inner sliding seal and located radially inward of the outer sliding seal and opening into the balancing area.

135. The dynamic sealing mechanism of claim 38, wherein the pressure housing has inner and outer seal grooves of annular form opening toward the first end of the seal housing and encircling the sealing surface of the shaft, the outer seal groove encircling the inner seal groove, the inner sliding seal contacting and being located at least partially within the inner seal groove, the outer sliding seal contacting and being located at least partially within the outer seal groove, a pressure communication path communicating the balancing fluid and the pressure of the balancing fluid to the sealed axially-facing balancing area of the seal housing, at least part of the pressure communication path comprising a hole having an open end facing the seal housing, the radial distance between the open end and the shaft being greater than the radial distance between the inner sliding seal and the shaft and being less than the radial distance between the outer sliding seal and the shaft.

136. The dynamic sealing mechanism of claim 38, further comprising a retaining member locating the seal housing axially relative to the pressure housing, the retaining member having an innermost inwardly facing peripheral surface having a innermost retainer diameter, and the second portion of the bore having a bore diameter, the bore diameter being smaller than the innermost retainer diameter.

137. The dynamic sealing mechanism of claim 38, wherein the pressure housing has an innermost inwardly facing peripheral surface having an innermost pressure housing diameter, and the second portion of the bore having a bore diameter, the bore diameter being smaller than the innermost pressure housing diameter.

138. The dynamic sealing mechanism of claim 38, further comprising:
a retaining member locating the seal housing axially relative to the pressure housing; and
a sealing element of annular form contacting and establishing sealing between the retaining member and the pressure housing, the sealing element located radially outward of and encircling the sealing surface of the shaft.

139. The dynamic sealing mechanism of claim 38, further comprising an annular retaining member capturing the seal housing axially relative to the pressure housing, the sealing surface of the shaft passing completely through the retaining member.

140. The dynamic sealing mechanism of claim 38, wherein the seal housing incorporates a stepped hole that extends from the first end to the second end of the seal housing, a stepped piston of the pressure supply mechanism located within at least part of the stepped hole, and at least part of the stepped hole forming a pressure communication path communicating the balancing fluid and the pressure of the balancing fluid to the third sealed portion of the seal housing, at least part of the stepped bore located radially outward from the dynamic seal.

141. The dynamic sealing mechanism of claim 38, further comprising a retaining member capturing the seal housing axially relative to the pressure housing, and no sealing element contacts both the retaining member and the seal housing, and the retaining member is not sealed with respect to the seal housing.

142. The dynamic sealing mechanism of claim 38, further comprising a retaining member capturing the seal housing axially relative to the pressure housing, and no sealing element contacts the retaining member, and the second fluid contacts an inwardly facing peripheral surface of the retaining member.

143. The dynamic sealing mechanism of claim 38, wherein the pressure housing has a pressure communication path passing through at least part of the pressure housing and having an open end located between the inner and outer sliding seals and facing toward the seal housing, the pressure communication path communicating the balancing fluid and the pressure of the balancing fluid between the inner and outer sliding seals.

144. The dynamic sealing mechanism of claim 38, further comprising a retaining member capturing the seal housing axially relative to the pressure housing, and the sealing surface of the shaft passing completely through the retaining member.

145. The dynamic sealing mechanism of claim 38, wherein the outer sliding seal is radially spaced from and encircles the inner sliding seal.

146. The dynamic sealing mechanism of claim 38, wherein the shaft has an axis and the radial distance between the first end of the seal housing and the axis of the shaft is greater than the radial distance between the sealing surface of the shaft and the axis of the shaft, and the radial distance between the second end of the seal housing and the axis of the shaft is no less than the radial distance between the sealing surface of the shaft and the axis of the shaft.

147. The dynamic sealing mechanism of claim 38, further comprising a retaining member capturing the seal housing axially relative to the pressure housing, the retaining member having an innermost surface of annular form, the innermost surface of the retaining member being larger than the sealing surface of the shaft and encircling at least part of the sealing surface.

148. The dynamic sealing mechanism of claim 38, wherein a generally radially oriented hole is formed in the seal housing and located between the dynamic seal and the first end of the seal housing, the hole communicating the first fluid and the pressure of the first fluid to the pressure supply mechanism.

149. The dynamic sealing mechanism of claim 47, wherein the retaining member is located radially outward of at least a portion of the sealing surface of the shaft and surrounds at least a portion of the sealing surface.

150. The dynamic sealing mechanism of claim 47, wherein the pressure communication path comprises a cross-drilled hole, at least part of the cross-drilled hole being a generally axially oriented hole located radially outward of the inner sliding seal and located radially inward of the outer sliding seal.

151. The dynamic sealing mechanism of claim 47, wherein the pressure housing has inner and outer seal grooves of annular form opening toward the first end of the annular seal housing and encircling the sealing surface of the shaft, the outer seal groove encircling the inner seal groove, the inner sliding seal contacting and being located at least partially within the inner seal groove, the outer sliding seal contacting and being located at least partially within the outer seal groove, at least part of the pressure communication path comprising a hole located between the inner and outer seal grooves.

152. The dynamic sealing mechanism of claim 47, wherein the retaining member has an innermost inwardly facing peripheral surface having a innermost retainer diameter, and the second portion of the throughbore having a throughbore diameter, the throughbore diameter being smaller than the innermost retainer diameter.

153. The dynamic sealing mechanism of claim 47, wherein the pressure housing has an innermost inwardly facing peripheral surface having an innermost pressure housing diameter, and the second portion of the throughbore having a throughbore diameter, the throughbore diameter being smaller than the innermost pressure housing diameter.

154. The dynamic sealing mechanism of claim 47, further comprising a sealing element of annular form contacting and establishing sealing between the retaining member and the pressure housing, the sealing element located radially outward of and encircling the sealing surface of the shaft.

155. The dynamic sealing mechanism of claim 47, wherein the sealing surface of the shaft passes completely through the retaining member.

156. The dynamic sealing mechanism of claim 47, wherein no sealing element contacts both the retaining member and the seal housing, and the retaining member is not sealed with respect to the seal housing.

157. The dynamic sealing mechanism of claim 47, wherein no sealing element contacts the retaining member.

158. The dynamic sealing mechanism of claim 47, wherein the shaft has an axis and the radial distance between the retaining member and the axis of the shaft is greater than the radial distance between the sealing surface of the shaft and the axis of the shaft.

159. The dynamic sealing mechanism of claim 47, wherein the shaft has an axis and the radial distance between the retaining member and the axis of the shaft is greater than the radial distance between the seal housing and the axis of the shaft.

160. The dynamic sealing mechanism of claim 47, wherein the outer sliding seal is radially spaced from and encircles the inner sliding seal.

161. The dynamic sealing mechanism of claim 47, wherein the at least one hole of the pressure communication path has an open end facing toward the seal housing, the radial distance between the open end and the shaft being greater than the radial distance between the inner sliding seal and the shaft and being less than the radial distance between the outer siding seal and the shaft.

162. The dynamic sealing mechanism of claim 47, wherein the retaining member has an innermost surface of annular form, the innermost surface of the retaining member being larger than the sealing surface of the shaft and encircling at least part of the sealing surface.

163. The dynamic sealing mechanism of claim 55, wherein the retaining member is located directly radially outward of at least a portion of the sealing surface of the shaft and surrounds at least a portion of the sealing surface.

164. The dynamic sealing mechanism of claim 55, wherein the at least one hole is a cross-drilled hole, at least part of the cross-drilled hole being a generally axially oriented hole located radially outward of the inner sliding seal and located radially inward of the outer sliding seal and establishing the open end opening into the balancing area.

165. The dynamic sealing mechanism of claim 55, wherein the pressure housing has inner and outer seal grooves of annular form opening toward the first end of the seal housing and encircling the sealing surface of the shaft, the outer seal groove encircling the inner seal groove, the inner sliding seal contacting and being located at least partially within the inner seal groove, the outer sliding seal contacting and being located at least partially within the outer seal groove, the at least one hole being located between the inner and outer seal grooves.

166. The dynamic sealing mechanism of claim 55, further comprising a sealing element of annular form contacting and establishing sealing between the retaining member and the pressure housing, the sealing element located radially outward of and encircling the sealing surface of the shaft.

167. The dynamic sealing mechanism of claim 55, wherein the sealing surface of the shaft passes completely through the retaining member.

168. The dynamic sealing mechanism of claim 55, wherein no sealing element contacts both the retaining member and the seal housing, and the retaining member is not sealed with respect to the seal housing.

169. The dynamic sealing mechanism of claim 55, wherein no sealing element contacts both the retaining member and the pressure housing, and the retaining member is not sealed with respect to the pressure housing.

170. The dynamic sealing mechanism of claim 55, wherein the shaft has an axis and the radial distance between the retaining member and the axis of the shaft is greater than the radial distance between the sealing surface of the shaft and the axis of the shaft.

171. The dynamic sealing mechanism of claim 55, wherein the shaft has an axis and the radial distance between the retaining member and the axis of the shaft is greater than the radial distance between the seal housing and the axis of the shaft.

172. The dynamic sealing mechanism of claim 55, wherein the outer sliding seal encircles the inner sliding seal.

173. The dynamic sealing mechanism of claim 55, wherein the retaining member has an innermost surface of annular form, the innermost surface of the retaining member being larger than the sealing surface of the shaft and encircling at least part of the sealing surface.

174. The dynamic sealing mechanism of claim 63, wherein the pressure communication path is a cross-drilled hole, at least part of the cross-drilled hole being a generally axially oriented hole located radially outward of the inner sliding seal and located radially inward of the outer sliding seal and establishing the open end opening into the balancing area.

175. The dynamic sealing mechanism of claim 63, wherein the pressure housing has inner and outer seal grooves of annular form opening toward the first end of the seal housing and encircling the sealing surface of the shaft, the outer seal groove encircling the inner seal groove, the inner sliding seal contacting and being located at least partially within the inner seal groove, the outer sliding seal contacting and being located at least partially within the outer seal groove, at least part of the pressure communication path being a hole located radially outward of the inner seal groove and located radially inward of the outer seal groove, and establishing the open end of the pressure communication path opening into the balancing area.

176. The dynamic sealing mechanism of claim 63, further comprising a retaining member locating the annular seal housing axially relative to the pressure housing, the retaining member having an innermost inwardly facing peripheral surface having a innermost retainer diameter, and the second portion of the bore having a bore diameter, the bore diameter being smaller than the innermost retainer diameter.

177. The dynamic sealing mechanism of claim 63, wherein the pressure housing has an innermost inwardly facing peripheral surface having a innermost pressure housing diameter, and the second portion of the bore having a bore diameter, the bore diameter being smaller than the innermost pressure housing diameter.

178. The dynamic sealing mechanism of claim 63, further comprising a retaining member locating the annular seal housing axially relative to the pressure housing, the sealing surface of the shaft passing completely through the retaining member.

179. The dynamic sealing mechanism of claim 63, further comprising a retaining member capturing the seal housing axially relative to the pressure housing, and no sealing element contacts both the retaining member and the seal housing, and the retaining member is not sealed with respect to the seal housing.

180. The dynamic sealing mechanism of claim 63, further comprising a retaining member capturing the seal housing axially relative to the pressure housing, and no sealing element contacts the retaining member.

181. The dynamic sealing mechanism of claim 63, further comprising a retaining member capturing the seal housing axially relative to the pressure housing, and the sealing surface of the shaft passing completely through the retaining member.

182. The dynamic sealing mechanism of claim 63, further comprising a retaining member capturing the seal housing axially relative to the pressure housing, the retaining member having an innermost surface of annular form, the innermost surface of the retaining member being larger than the sealing surface of the shaft and encircling at least part of the sealing surface.

183. The dynamic sealing mechanism of claim 182, wherein the sealing surface of the shaft extends completely through the innermost surface of the retaining member.

184. The dynamic sealing mechanism of claim 114, wherein the first portion of the throughbore has at least one diametric dimension and the sealing surface of the shaft has a diametric dimension, and no diametric dimension of the first portion of the throughbore is smaller than the diametric dimension of the sealing surface of the shaft.

185. The dynamic sealing mechanism of claim 71, wherein the generally axially oriented bore extending completely through the seal housing has at least one diametric dimension and the sealing surface of the shaft has a diametric dimension, and no diametric dimension of the seal housing bore is smaller than the diametric dimension of the sealing surface of the shaft.

186. The dynamic sealing mechanism of claim 71, wherein the shaft has an axially facing surface, and no portion of the seal housing is axially aligned with the axially facing surface.

187. The dynamic sealing mechanism of claim 47, wherein the shaft has an axially facing surface, and no portion of the seal housing is axially aligned with the axially facing surface.

188. A dynamic sealing mechanism for a machine assembly, comprising:
a pressure housing;
a retaining member;
a seal housing having oppositely facing first and second ends and an outer peripheral surface, a generally axially oriented throughbore extending from said first end to said second end, the retaining member capturing the seal housing axially relative to the pressure housing while allowing the seal housing to move laterally relative to the pressure housing, the seal housing located at least partially within the pressure housing;
a shaft having an externally oriented sealing surface of cylindrical form, the entire throughbore and the first and second ends of the seal housing being larger than the sealing surface, the sealing surface locating the seal housing laterally;
a dynamic seal contacting and being axially located by the seal housing and contacting and establishing a sealed relationship with the sealing surface of the shaft and being a barrier to a first fluid having a first pressure, the sealing surface of the shaft being relatively movable with respect to the dynamic seal and with respect to the seal housing;
axially compressed inner and outer sliding seals in face sealing contact with the first end of the seal housing, the inner and outer sliding seals cooperating to define a sealed balancing area on the first end of the seal housing, at least a portion of the balancing area being located between the inner and outer sliding seals;
a first pressure communication path in the form of a hole having first and second open ends, the first pressure communication path penetrating and communicating through at least a portion of the seal housing, at least part of the first pressure communication path located radially outward of the dynamic seal between the dynamic seal and the outer peripheral surface of the seal housing, the first open end of the first pressure communication path opening into the portion of the balancing area located between the inner and outer sliding seals;
a second pressure communication path in the form of a generally radially oriented hole having an open end exposed to the first fluid and opening into the throughbore, the second pressure communication path located between the dynamic seal and the inner sliding seal and located between the dynamic seal and the first end of the seal housing;
the dynamic seal and the inner sliding seal being exposed to the first fluid, the dynamic seal and the outer sliding seal being exposed to and retaining a second fluid having a second pressure, the second pressure being greater than the first pressure;

at least a portion of the first end of the seal housing being exposed to the first fluid and at least a portion of the first end of the seal housing being exposed to the second fluid;

the first pressure producing an axially acting hydraulic force on at least a portion of the first end of the seal housing in a first axial direction, the second pressure creating an axially acting hydraulic force on at least a portion of the first end of the seal housing in the first axial direction and creating an axially acting hydraulic force on at least a portion of the second end of the seal housing in a second axial direction, the first axial direction being opposite to the second axial direction, at least a portion of the throughbore of the seal housing being exposed to the first fluid and at least a portion of the throughbore of the seal housing being exposed to the second fluid;

a stepped piston and first and second reciprocating seals located in a mating stepped bore of the seal housing, the first and second reciprocating seals establishing sealed contact with the stepped piston and with the seal housing, establishing a sealed region located between the first and second reciprocating seals, the first and second reciprocating seals establishing first and second sealed areas and a sealed balancing area, a first portion of the stepped piston being exposed to the first fluid, a second portion of the stepped piston exposed to the second fluid, and a third portion of the stepped piston being exposed to a balancing fluid, at least some of the balancing fluid being located within the sealed region of the stepped bore between the first and second reciprocating seals;

the first pressure communication path communicating balancing fluid from the sealed region of the stepped bore to the portion of the balancing area located between the inner and outer sliding seals, the second open end of the first pressure communication path opening into the sealed region of the stepped bore;

the second pressure communication path intersecting the stepped bore of the seal housing, and communicating the first fluid and the pressure of the first fluid to the first portion of the stepped piston; and at least part of the stepped bore located radially between the external sealing surface of the shaft and the outer peripheral surface of the seal housing.

189. The dynamic sealing mechanism of claim 188, wherein a first portion of the throughbore located between the first end of the seal housing and the dynamic seal and exposed to the first fluid, and a second portion of the throughbore located between the dynamic seal and the second end of the seal housing and exposed to the second fluid, the first and second portions of the throughbore being larger than the sealing surface of the shaft.

190. The dynamic sealing mechanism of claim 188, wherein the first and second ends of the seal housing are larger than the sealing surface of the shaft.

191. The dynamic sealing mechanism of claim 188, wherein the retaining member is located radially outward of at least a portion of the sealing surface of the shaft and surrounds at least a portion of the sealing surface.

192. The dynamic sealing mechanism of claim 188, wherein the shaft has an axis and the radial distance between the retaining member and the axis of the shaft is greater than the radial distance between the sealing surface of the shaft and the axis of the shaft.

193. The dynamic sealing mechanism of claim 188, wherein the shaft has an axis and the radial distance between the retaining member and the axis of the shaft is greater than the radial distance between the seal housing and the axis of the shaft.

194. A dynamic sealing mechanism for a machine assembly, comprising:

a pressure housing;

a retaining member;

a seal housing having oppositely facing first and second ends and an outer peripheral surface, a generally axially oriented bore extending completely through the seal housing from the first end to the second end, the retaining member capturing the seal housing axially relative to the pressure housing while allowing the seal housing to move laterally relative to the pressure housing;

a shaft having an externally oriented sealing surface of cylindrical form having a surface diameter, the sealing surface locating the seal housing laterally;

a dynamic seal contacting and axially located by the seal housing and contacting and establishing a sealed relationship with the sealing surface of the shaft, the sealing surface of the shaft being relatively movable with respect to the dynamic seal and with respect to the seal housing;

a first portion of the bore located between the first end of the seal housing and the dynamic seal and exposed to a first fluid having a pressure, and a second portion of the bore located between the dynamic seal and the second end of the seal housing and exposed to a second fluid having a pressure, the pressure of the second fluid being greater than the pressure of the first fluid, the first and second portions of the bore and the first and second ends of the seal housing being larger in diameter than the surface diameter of the sealing surface;

the seal housing having a generally radially oriented hole located between the first end of the seal housing and the dynamic seal, with an open end facing generally radially inward, and having a generally axially oriented hole located radially outward of the dynamic seal and radially between the dynamic seal and the outer peripheral surface of the seal housing, the generally radially oriented hole intersecting the generally axially oriented hole, together the radially oriented hole and the generally axially oriented hole forming a cross-drilled hole, the generally radially oriented hole and at least a portion of the generally axially oriented hole being exposed to the first fluid and the pressure of the first fluid;

axially compressed annular inner and outer sliding seals in face sealing contact with the seal housing and encircling the shaft, the inner and outer sliding seals cooperating to define an annular sliding area, the outer sliding seal being radially spaced from the inner sliding seal and both the inner and outer sliding seals being radially spaced from the shaft, the inner sliding seal being held by and located at least partially within an inner face seal groove of annular form, the outer sliding seal being held by and located at least partially within an outer face seal groove of annular form;

the dynamic seal and the inner sliding seal exposed to and being barriers to the first fluid, the dynamic seal and the outer sliding seal being exposed to and being barriers to the second fluid;

at least a portion of the first end of the seal housing being exposed to the first fluid and the pressure of the first fluid, the outer peripheral surface of the seal housing, at least a portion of the first end of the seal housing, and at least a portion of the second end of the seal housing being exposed to the second fluid and the pressure of the second fluid, and the first pressure producing an axially acting hydraulic force on at least a portion of the first end of the seal housing in a first axial direction, the second pressure creating an axially acting hydraulic force on at least a portion of the first end of the seal housing in the first axial direction and creating an axially acting hydraulic force on at least a portion of the second end of the seal housing in a second axial direction, the first axial direction being opposite to the second axial direction.

195. The dynamic sealing mechanism of claim 194, wherein a fluid path communicates between the bore and the outer peripheral surface, the fluid path being exposed to and containing at least some of the second fluid.

* * * * *